INVENTORS
KLAUS W. OTTEN,
JOHN B. CHRISTIE &
GERALD B. HOLLINS

BY
THEIR ATTORNEYS

INVENTORS
KLAUS W. OTTEN,
JOHN B. CHRISTIE &
GERALD B. HOLLINS

BY Louis A. Kline

Glenn W. Bones

THEIR ATTORNEYS

FIG. 4A
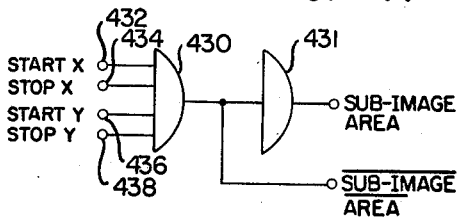
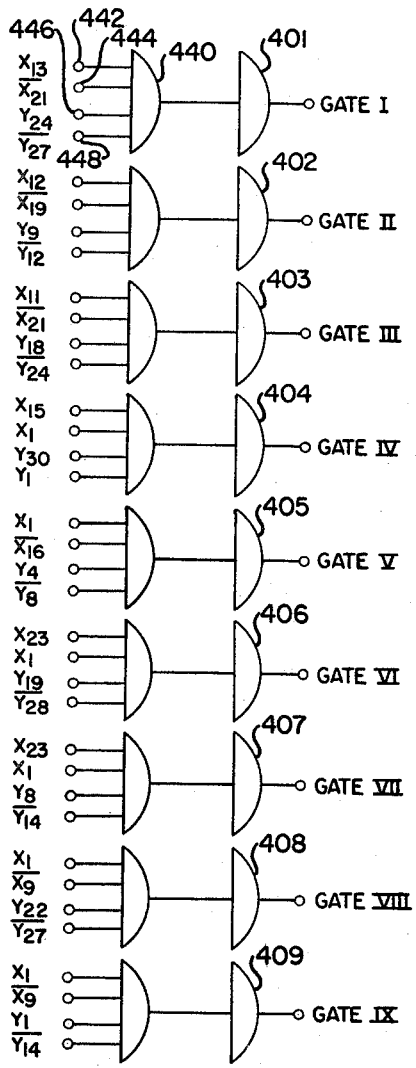
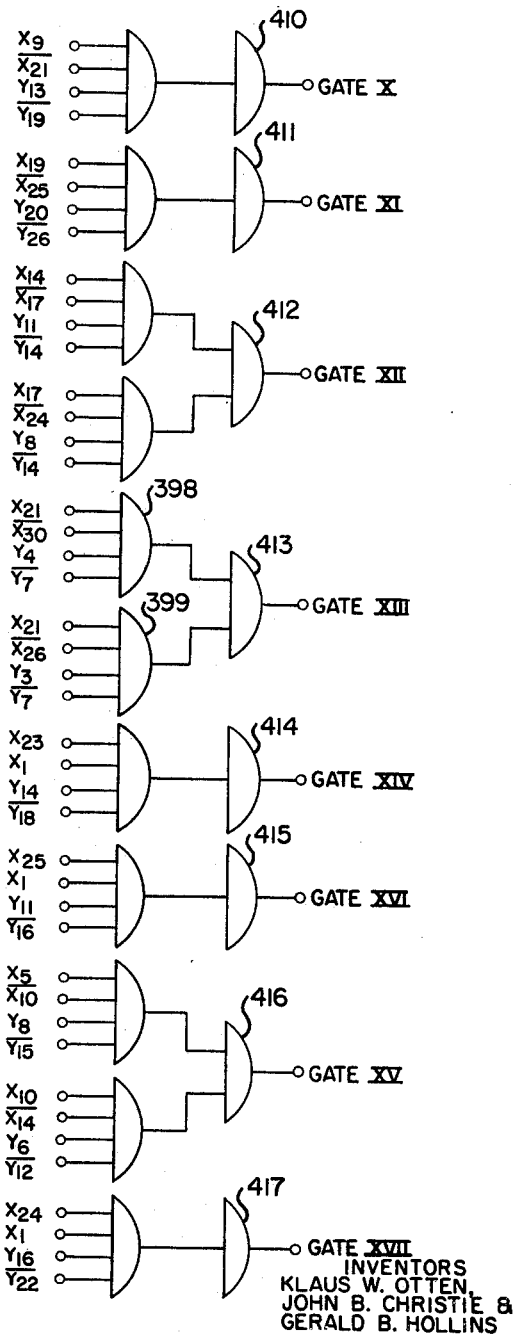

INVENTORS
KLAUS W. OTTEN,
JOHN B. CHRISTIE &
GERALD B. HOLLINS

THEIR ATTORNEYS

INVENTORS
KLAUS W. OTTEN,
JOHN B. CHRISTIE &
GERALD B. HOLLINS

BY

THEIR ATTORNEYS

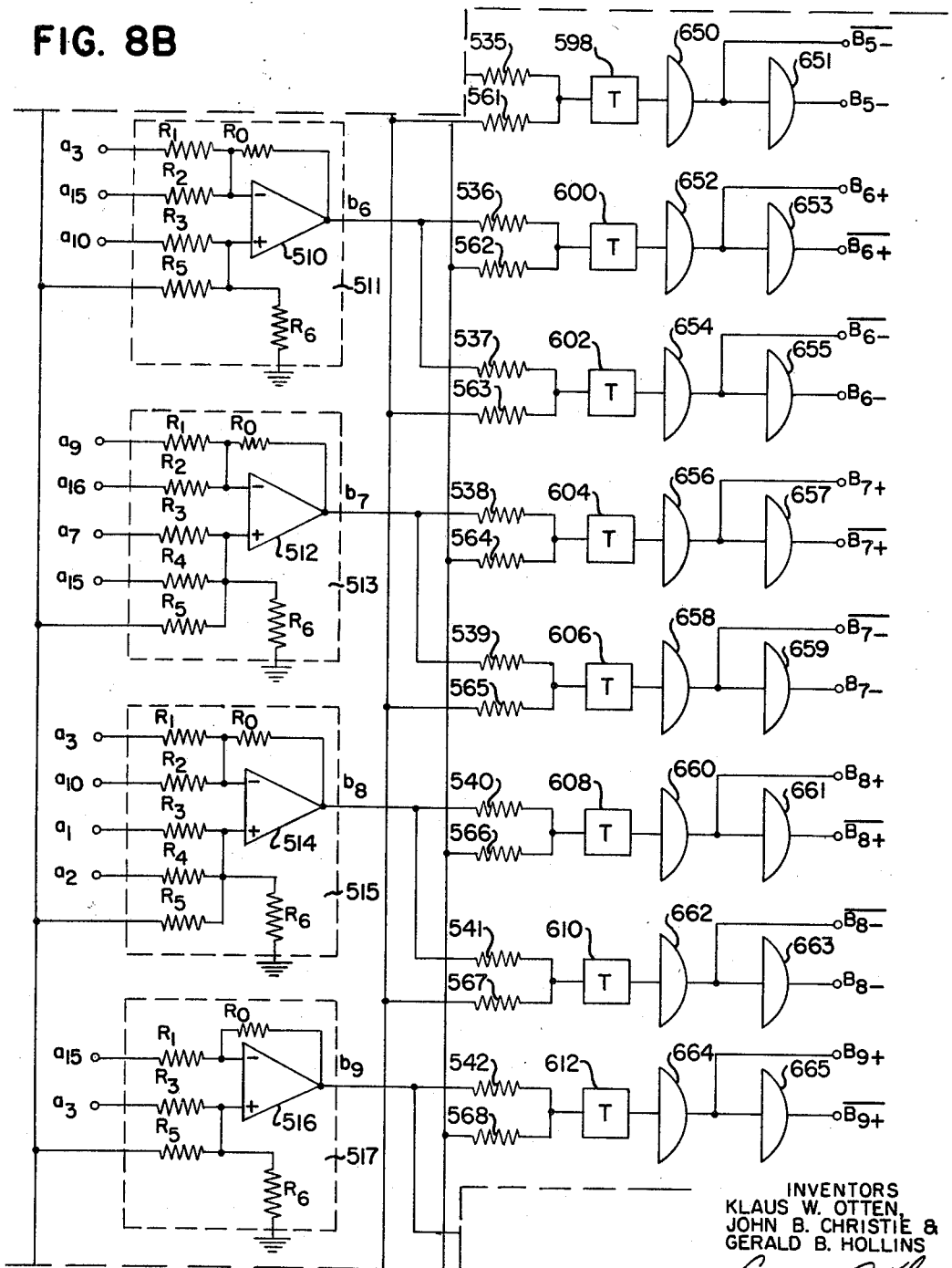

FIG. 11
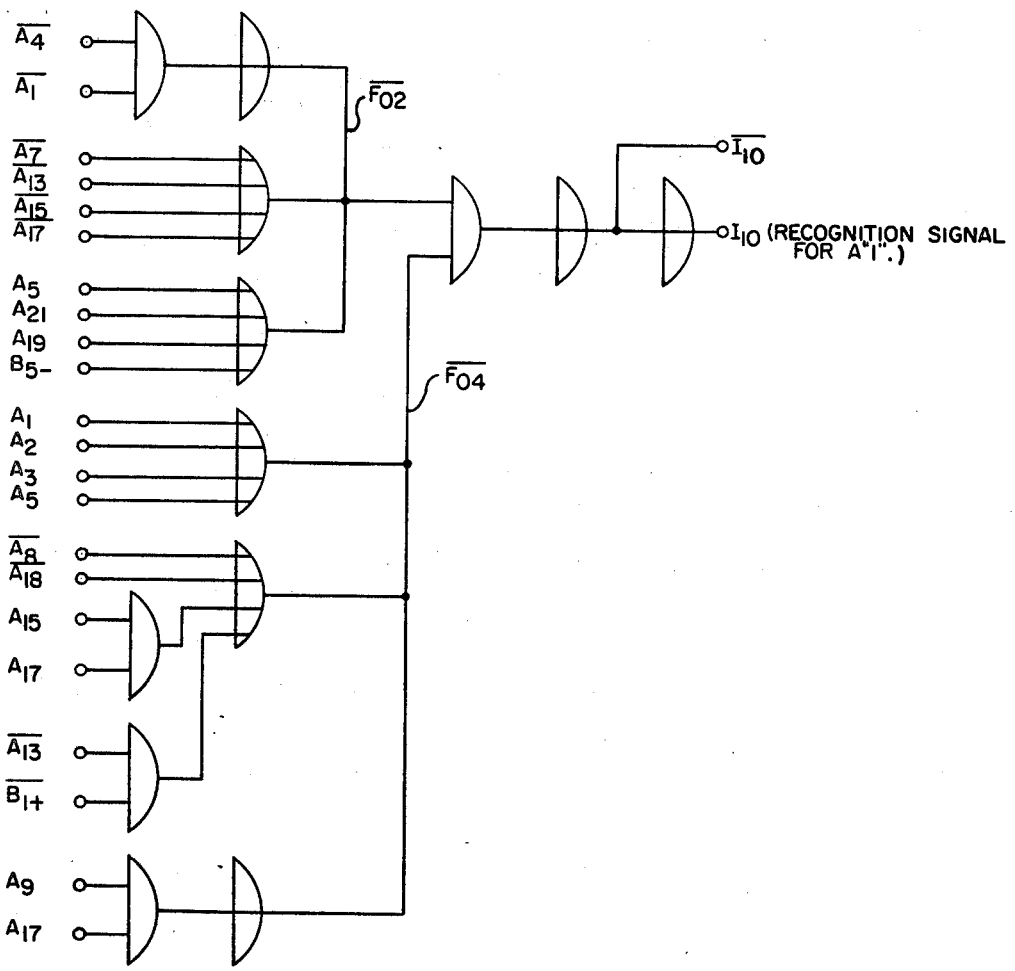
FIG. 11a
SYMBOL DEFINITION
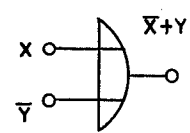
NAND GATE
(OR FUNCTION)
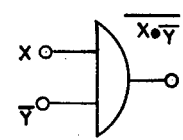
NAND GATE
(AND FUNCTION)

Jan. 27, 1970     K. W. OTTEN ET AL     3,492,647
OPTICAL CHARACTER READER EMPLOYING GATED AMPLIFIERS
Filed Dec. 23, 1966     18 Sheets-Sheet 11

Jan. 27, 1970 K. W. OTTEN ET AL 3,492,647
OPTICAL CHARACTER READER EMPLOYING GATED AMPLIFIERS
Filed Dec. 23, 1966 18 Sheets-Sheet 15

INVENTORS
KLAUS W. OTTEN,
JOHN B. CHRISTIE &
GERALD B. HOLLINS

BY

THEIR ATTORNEYS

United States Patent Office 3,492,647
Patented Jan. 27, 1970

3,492,647
OPTICAL CHARACTER READER EMPLOYING
GATED AMPLIFIERS
Klaus W. Otten, Xenia, and John B. Christie and Gerald
B. Hollins, Dayton, Ohio, assignors to The National
Cash Register Company, Dayton, Ohio, a corporation
of Maryland
Filed Dec. 23, 1966, Ser. No. 604,413
Int. Cl. G06k 9/12
U.S. Cl. 340—146.3     18 Claims

ABSTRACT OF THE DISCLOSURE

This reading machine employs a scanning device which scans an image area containing a data pattern to develop a signal that is sensed by a sensing device. The sensed signal is coupled to a number of operational amplifiers that are under control of a control means that serves to activate each operational amplifier only during selected sub-portions of the scan of the main signal area in correspondence with a plurality of sub-image areas of the main image area. The sub-image areas are selected to represent predetermined comparisons of the data pattern. A plurality of analog difference signals are then formed which are each a function of the difference between the sum of one set of operational amplifier output signals and the sum of a second set of operational amplifier output signals. The analog difference signals and the output signals of the operational amplifiers are then digitized and are combined in digital logical circuits to produce a digital recognition signal that represents the imaged data pattern.

---

The present invention relates in general to optical character recognition and in particular to optical character recognition readers that employ a number of sub-image or mask areas to view selected portions of an image area.

The present invention involves a novel character recognition scheme which uses video-processing operational amplifiers that are associated with various sub-image areas to develop digital recognition signals which identify characters that are imaged in an image area.

A number of optical character recognition readers have been developed which utilize the "best-match" technique of character recognition. In the "best-match" technique, a number of masks are superimposed over an imaged character, and a set of video signal patterns are developed through such masks to represent the imaged character. In the "best-match" technique, the set of video patterns generated by the character under observation are matched to a particular character from an "ideal" set of characters according to the video patterns generated.

The reader of the present invention directly develops digital recognition signals from the video signals which are generated by the unknown imaged characters when various sub-image or mask areas are employed. The present recognition reader, therefore, does not require that the video signals that it develops be compared with signals which represent "ideal" characters.

The video signals which are generated immediately from the imaged character and the sub-image areas in the reader of the present invention are called the "$a_N$" functions. The digital signals which are developed from the "$a_N$" functions are designated as the "$A_N$" functions. Mathematically, the "$a_N$" functions generated in the reader are described by:

$$a_N = \int_0^t V(t) R_N(t) d(t_N) \text{ (where } N = 1, 2, 3, \cdots n\text{)};$$

where $V(t)$ is a video signal derived from scanning an unknown character during the time interval $d(t_N)$ and $R_N(t)$ is a binary function which symbolizes a mask or sub-image area so that either:

$$a_N = \int_0^t V(t) d(t_N) \text{ or } a_N = 0$$

according to the value of the binary function $R_N(t)$ during the time interval $d(t_N)$. A value of $R_N(t) = 1$ corresponds to a sub-image area, and the video signal from the character is used in forming the "$A_N$" function signal when $R_N(t) = 1$. If $R_N(t) = 0$, the video signal received from the character is not used in forming the "$A_N$" function signal. The $R_N(t)$ functions are implemented in the reader by gate circuits which are connected to the inputs of the video integrating amplifiers. The gate circuits allow the integrating amplifiers to process video information when $R_N(t) = 1$, and they block video information to the amplifiers when $R_N(t) = 0$.

A plurality of gated video integrating amplifiers are connected to a video pre-amplifier that is coupled to a photomultiplier pick-up tube in the preferred embodiment of the present invention. A light scanning beam from a scanner causes light reflection at the image area, the intensity of which varies according to the imaged character. An alternate embodiment of this invention employs characters which are stored in a cathode ray storage tube, and electronic scanning means are employed. The video integrating amplifiers all have individual gate control circuits, and therefore each amplifier is associated with an individual $R_N(t)$ function. The $R_N(t)$ function represents a particular sub-image area of the main image area, and the $R_N(t)$ function has a value of "one" whenever the scan is traversing a portion of the associated sub-image area. Thus the video signal which is selectively coupled from the photomultiplier tube to a particular video integrating amplifier represents the video signal which is associated with a particular sub-image area.

The preferred embodiment of this invention also includes a video integrating amplifier which is gated open during scan of the total image area. The imaged character is normalized in size, by methods known in the art, in both the vertical and the horizontal directions in the preferred embodiment. The output of a video amplifier which is open during the scan of the whole normalized image area, therefore, represents the amount of the total image area which is covered by the imaged character, and this output is used as a normalizing signal, as will be described.

Although the preferred embodiment employs a normalization signal which is derived by integration of the video information signal over the total image area, it is apparent that other normalization signals may also be used; for example, an integrated summation of the video signal over only a part of the total image area may be used for normalization. The measurement of the maximum "black signal" that is received over the image area or the "black signal" received from a particular group of sub-image areas may also be used as normalization signals. Elimination of the normalization signal completely will affect the accuracy of the reader of the present invention to some extent when used with a large number of different font characters; however, a reader of a more limited accuracy is still achieved by the reader of the present invention even without using a normalization signal.

The output signals from the video integrating amplifiers which are coupled to the photomultiplier are selectively gated to form the analog "$a_N$" function signals, each of which corresponds to a particular sub-image area. The various "$a_N$" function signals are compared with other "$a_N$" function signals, and the resulting comparison signals are analog signals which are called the "$b_N$" function signals.

The "$a_N$" function signals and the "$b_N$" function signals are applied to threshold detecting circuits which convert these signals into digital logic level "$A_N$" and "$B_N$" signals. In the preferred embodiment, the threshold level of the detecting circuits which transpose the "$a_N$" and the "$b_N$" signals into "$A_N$" and "$B_N$" signals utilizes a normalization signal which is derived by intergrating the video signal received over the total image area to insure that the "$A_N$" and the "$B_N$" function signals that are generated are normalized with respect to this video signal, for reasons which will be explained subsequently.

It is, therefore, an object of the present invention to provide an optical recognition reader that identifies an unknown character which is image in an image area by translation of video signals, which correspond to a plurality of sub-image areas, into a recognition signal, which is representative of the unknown imaged character.

It is another object of the present invention to provide digital conversion means that indicate whether a group of information signals is greater or smaller than a predetermined fraction of a normalization signal.

It is a further object of the present invention to provide digital conversion means that indicate whether the difference between one group of information signals and another group of information signals is greater or smaller than a predetermined fraction of a normalization signal.

Other object and features of the optical recognition reader of this invention will become apparent to those skilled in the art from the description, claims and drawings describing the present invention, wherein:

FIG. 4A is a diagrammatic illustration of a portion of the control gate logic of the reader for gate signals I through XVII.

FIG. 8B is a diagrammatic illustration of the "$b_N$" and the "$B_N$" function signal generation portion of the reader for "$B_N$" functions "$B_6$" through "$B_9$."

FIG. 11 is a diagrammatic illustration of the recognition logic circuit for a "1."

FIG. 11a illustrates the logic symbols employed in the recognition logic circuits.

Figure 1:
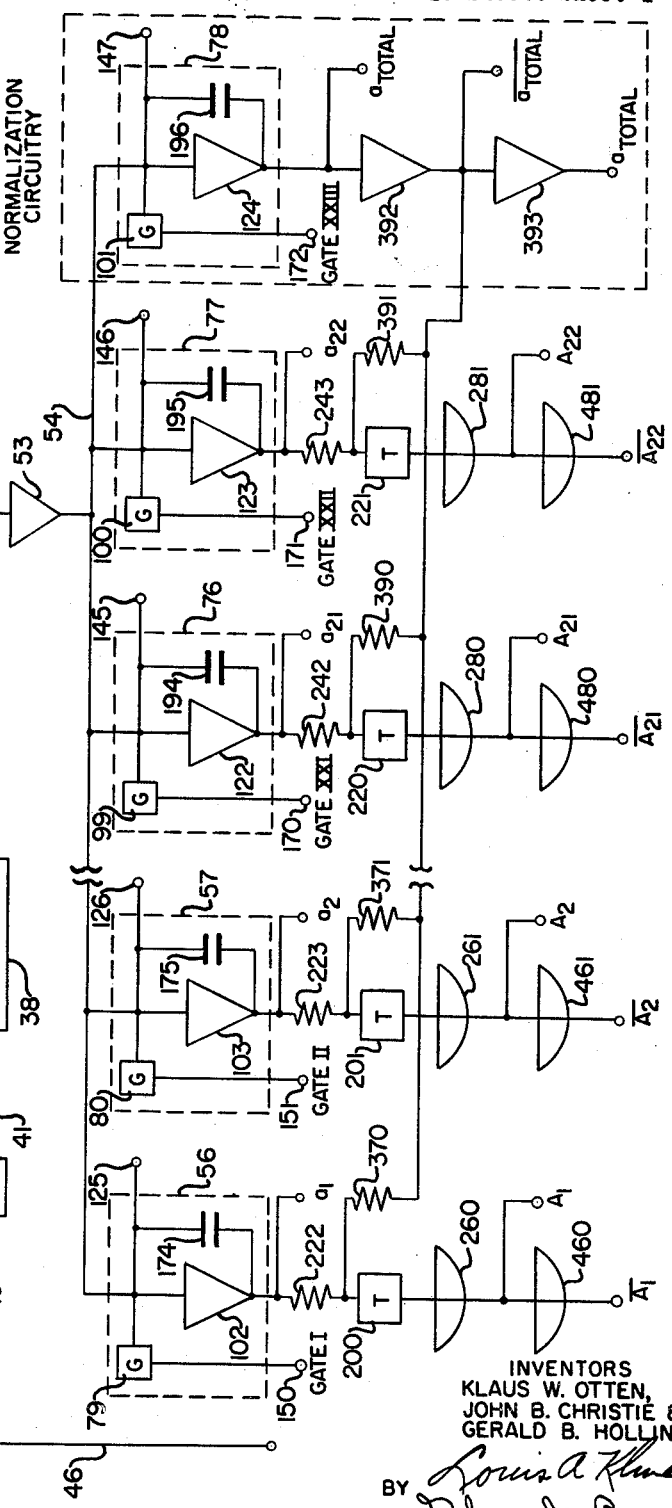
FIG. 1 is a diagrammatic illustration of the "$a_N$" and the "$A_N$" function signal generation portion of the reader.

FIG. 1 shows an unknown character, shown for example as the numeral "3," imaged on a normalized image area. Size normalization may also be achieved by elecby imaging a standard-size character in a fixed-size image area. Size normalization may also be achieved by electronic normalization of the unknown character on a cathode ray storage tube when electronic scanning means and cathode ray storage of the character to be read are employed and the size of the character is not standardized. The character image is normalized in the preferred embodiment of the present invention, but it is readily appreciated by one skilled in the art that the present invention is not necessarily limited to a normalized character image.

The scanner 30 produces a raster scan light beam pattern 32 across the image area 34. The scan control unit 36 supplies the X-scan or horizontal scan signal to the scanner 30 on the line 35, and the Y-scan or vertical scan signal is supplied to the scanner 30 on the line 39 by the Y-scan control unit 38. The scan control unit 38 applies a "Start Sweep" signal to the line 39 at the beginning of each scan, thereby setting the flip-flop 40. Setting of the flip-flop 40 supplies one input to the "AND" gate 42. The clock 44 is a repetitive square-wave signal generator which has an input terminal which is connected to the Y-scan control unit 38 by the line 33 to receive a sync signal from the Y-scan control unit 38 and an output terminal which is connected to the other input of the "AND" gate 42 through the line 45. When the flip-flop 40 is set, the set output of the flip-flop is applied to the line 43, both of the inputs to the "AND" gate 42 are satisfied periodically in accordance with the signal from the clock 44 on the line 45, and a repetitive square-wave signal is therefore effectively passed through the "AND" gate 42 to the register control line 46. The clock 44 is constructed to produce thirty-two square-wave pulses per sawtooth sweep output of the Y-scan control unit 38. At the end of the desired Y sweep signal, an "End of Sweep" signal is applied to the line 41 by the Y-scan control unit 38, thereby resetting the flip-flop 40 and opening the "AND" gate 42 to prevent additional clock pulses from being applied to the register control line 46.

The pulses on the register control line 46 are used as counting pulses by a pair of registers which are used to electrically generate the sub-image areas of the preferred embodiment of this invention. FIGS. 5, 6, and 7 are representations of the sub-image areas of the preferred embodiment of this invention. The sub-image areas that are formed in the preferred embodiment of the present invention are presented as combinations of rectangles for ease of implementation, but it is obvious that other forms of sub-image areas could be used with the reader of the present invention; for example, photo-masks may be employed to form the sub-image areas. The boundaries of the various sub-image areas of the preferred embodiment are controlled by a plurality of gates, shown on FIGS. 4A and 4B. Inputs to the gates are derived from the various stages of the $y$ and $x$ registers 48 and 50 of FIG. 2. The $y$-register 48 has the set input of its first flip-flop stage 250 connected to the register control line 46. The set input of the first flip-flop stage 257 of the $x$-register 50 is connected to the reset output of the last flip-flop stage 253 of the y-register 48. The y-register 48 is a flip-flop register which is constructed to advance its count once for each digital input pulse received on the register control line 46. At the end of thirty-two counts, the y-register supplies itself wtih a reset signal that clears out the y-register and prepares the y-register to begin counting again upon receipt of the next register control pulse on the line 46. The y-register reset signal is also coupled to the input of the first flip-flop stage 257 of the x-register. The x-register employs the y-register reset signal as a counting pulse in the same manner that the y-register employs the register control pulse on the register control line 46 as a counting pulse. The x-register 50 is connected to the y-register 48 by the set output of the flip-flop 253 of the y-register, so that the x-register receives one input pulse for every thirty-two pulses that are present on the register control line 46.

Each time the y-register 48 resets, the x-register 50 receives one counting pulse. The x-register 50 resets after it has received thirty input pulses. The thirty-two counts of the y-register 48 and the thirty counts of the x-register 50, therefore, encompass the total image area 34, each sub-image area of the total image area 34 being defined by particular counts in the x and y registers.

The photo-multiplier tube 52 of FIG. 1 is positioned to sense the video signals which are developed by the unknown character as the scanning beam from the scanner 30 scans the image area. The output of the photo-multiplier tube 52 is coupled to the video preamplifier 53. A single video input line 54 couples the output of the video preamplifier 53 to the input of the integrating circuits 56 through 78. (The integrating circuits 58 through 75 are not shown in FIG. 1, since these are identical to the integrating circuits which are shown in FIG. 1.) The input to the gate circuit associated with each of the integrating circuits 56 through 78 is a control input from the gate control circuits of FIGS. 4A and 4B, each of which selectively controls passage of the video signal which is present on the line 54 through the associated integrating amplifier—for example, the amplifier 102—when the associated gate circuit—for example, the gate 79—is activated by a signal from the associated control circuit—for example, the control circuit 401 of FIG. 4A. The control circuits shown in FIG. 4A and FIG. 4B for the integrating circuits 56 through 78 are digital logic circuits which have inputs from the y-register 48 and the x-register 50 which control the opening and closing of the gates in response to the count in the two registers, thereby electronically creating the sub-image areas I through XXII, which are represented in FIGS. 5, 6, and 7. If a portion of an imaged character is enclosed by any of the sub-image areas during the time the scanning beam from the scanner 30 is traversing the sub-image area, a video signal is passed through the integrating amplifiers which are gated open at that particular instant. Video information received at a particular amplifier will not be passed through the amplifier when the gate associated with the amplifier is closed. The gated integrating circuits 56 through 78 of FIG. 1 are identical to the typical integrating circuit shown in FIG. 3.

Figure 3:
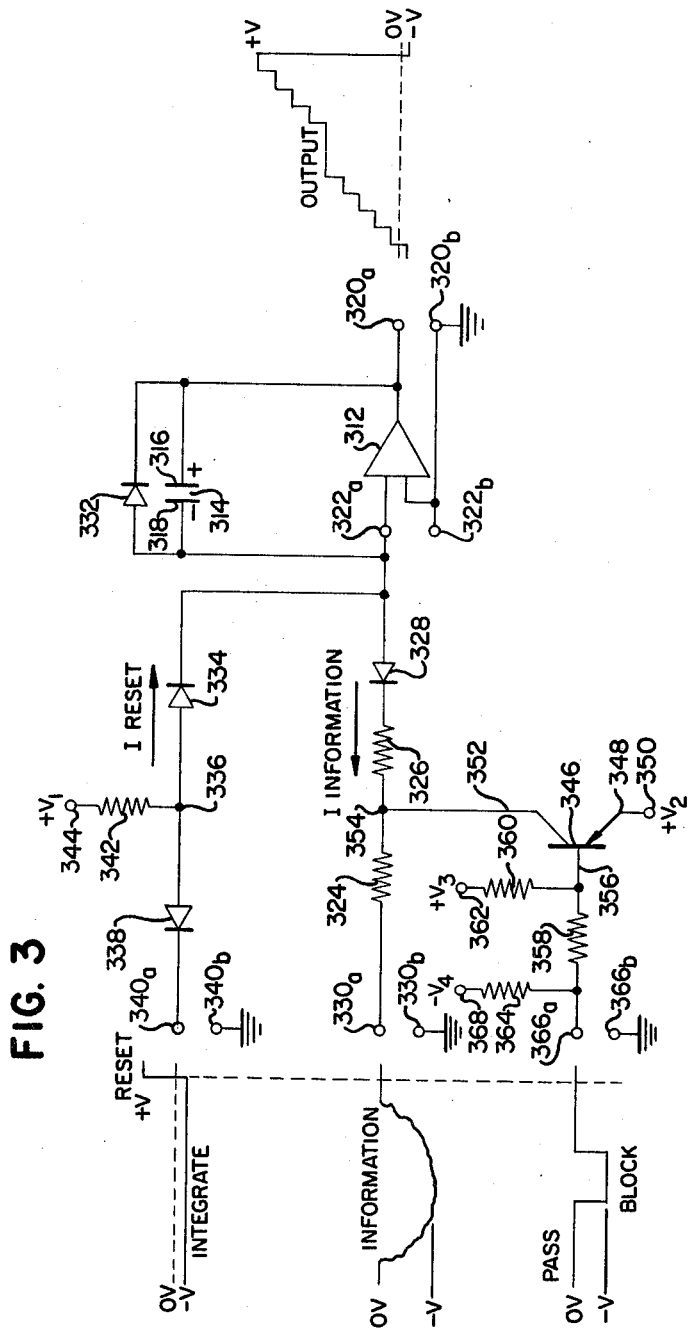
FIG. 3 is a schematic of a typical integrating circuit.

The integrating circuit of FIG. 3 is composed of a signal-inverting Class A amplifier circuit 312, which has a feedback capacitor 314 connected between the input terminal $322_a$ and the output terminal $320_a$. The capacitor 314 has a plate 316 connected to the output terminal $320_a$ and a plate 318 connected to the input terminal $322_a$. The use of a capacitive feedback path with an amplifier to produce an output signal which is the integral of the input signal to the amplifier is well known in the art and will not be discussed in detail. Reference may be had to the "Handbook of Operational Amplifier Applications," Burr-Brown Research Corporation, 1963, for detailed circuit equations and equivalent circuits for such an integrating operational amplifier.

The amplifier 312 is a signal-inverting amplifier that is biased, by methods known in the art, to produce a ground potential on the output terminal $320_a$ when the potential on the terminal $330_a$ is at a ground potential. When the input potential on the terminal $330_a$ becomes negative in polarity, the potential on the output terminal $320_a$ becomes positive in polarity, and the capacitor 314 acquires a charge which represents the time integral of the total negative input signal which is applied across the input terminals $330_a$ and $330_b$. The charge on the capacitor 314 produces a negative voltage on the plate 318 and a positive polarity voltage on the plate 316. The negative polarity input voltage appearing on the terminal $330_a$ supplies a current to the terminal $322_a$ through the resistors 324 and 326 and the diodes 328. The resistor 324 is connected to the terminal $330_a$, which is coupled to the line 54 of FIG. 1 that is integrated. The resistor 326 is connected to the resistor 324 and to the cathode of the diode 328. The diode 328 has its anode connected to the input terminal $322_a$. The diode 332 is connected with its cathode connected to the output terminal $320_a$ and its anode connected to the input terminal $322_a$. The diode 334 is connected with its anode connected to the junction 336 and its cathode connected to the input terminal $322_a$. The diode 338 is connected with its anode connected to the junction 336 and its cathode connected to the reset terminal 340, which is coupled to the reset side of the flip-flop 256, which is the last stage flip-flop of the x-register 50, and therefore the reset signal occurs only at the end of the scan of the total image area. The resistor 342 is connected between the positive potential supply 344 and the junction 336. The resistor 342 and the diodes 338 and 334 form a conventional diode current steering gate.

The reset signal applied across the terminals $340_a$ and $340_b$, which is derived from the reset side of the flip-flop 256, is applied to all of the integrating circuits of the reader simultaneously. The reset signal is normally at a negative potential level whenever the video signals are present across the terminals $330_a$ and $330_b$, and the reset signal goes to a positive voltage level when a reset signal is desired. A level-converting amplifier may be inserted between the flip-flop 256 and the terminals 340 if the output of the flip-flop 256 is not at the proper level to supply the necessary reset signal.

When an information signal is received across the terminals $330_a$ and $330_b$ and the gate transistor 346 is not conducting, the amplifier 312 amplifies and inverts the negative polarity input signal that appears on the amplifier input terminal $322_a$. The capacitor 314 acquires a charge which represents the time integral of the video signal which is developed across the terminals $330_a$ and $330_b$ during the reading scan of the image area. During this period, while the plate 316 of the capacitor 314 is acquiring a positive polarity charge and the plate 318 of the capacitor 314 is acquiring a negative polarity charge, the diodes 332 is reverse-biased and acts as a high impedance element.

The gate transistor 346 is connected in a grounded emitter configuration, with the emitter 348 connected to a source of low positive potential and the collector 352 connected to the junction 354 between the input resistors 324 and 326. The base 356 of the transistor 346 is connected to one end of the input resistor 358, which is connected to the input terminal $366_a$ at the other end. The resistor 360 is connected between the base 356 of the transistor 346 and the positive potential supply 362, and the resistor 364 is connected between the gate input terminal $366_a$, which is coupled to the gate control circuit that supplies the gate signals and the negative potential supply 368 to form the bias network for the transistor 346.

The transistor 346 in the embodiment of FIG. 3 is a PNP transistor, and the biasing network is designed to insure that the transistor 346 is cut off whenever the gate control signal applied to the terminal 366ₐ is at a ground potential level, thereby allowing a current to flow through the resistors 324 and 326 and the diode 328 to the input terminal 322ₐ in response to the video signal that is developed across the video input terminals 330ₐ and 330ᵦ.

When the gate control signal applied to the terminal 366ₐ is at a negative potential level, the transistor 346 is biased to saturation, thereby effectively coupling the positive polarity power supply 350 to the junction 354. A positive potential level at the junction 354 serves to reverse-bias the diode 328. Consequently, when the gate control signal on the gate input terminal 366ₐ is at a negative polarity potential level, current developed as a result of a video signal applied across the video input terminals 330ₐ and 330ᵦ is shunted through the transistor 346. The reverse-biased diode 328 prevents voltage variations which occur across the collector-emitter junction of the transistor 346 as a result of this current from affecting the amplifier 312. The resistor 324 minimizes the loading effect of the integrating circuit on the video signal source when the gate to the integrating circuit is closed and the transistor 346 is in saturation.

To reset the integrating circuit and to prepare the circuit for new video signals, it is necessary to discharge the potential accumulated on the capacitor 314. The application of a negative potential level to the cathode of the diode 338 by the reset side of the flip-flop 256 forward-biases the diode 338, causing conduction through the diode 338 during the video receiving period. The voltage at the junction 336 becomes essentially equal to the negative polarity voltage on the terminal 340ₐ. The negative polarity voltage present at the junction 336 reverse-biases the diode 334, thereby effectively blocking any current flow through the diode 334 into the input terminal 322ₐ when negative polarity video signals are being received across the terminals 330ₐ and 330ᵦ.

When a reset signal occurs, a positive polarity voltage level is applied to the cathode of the diode 338 through the terminal 340ₐ. A positive polarity voltage level on the cathode of the diode 338 reverse-biases the diode 338, thereby preventing conduction through the diode 338. The voltage at the junction 336 now becomes a more positive voltage in potential, and the diode 334 is forward-biased as a result, and a substantially constant current flow is supplied to the input terminal 322ₐ through the forward-biased diode 334 and the resistor 342, which is connected to the positive polarity power supply. Since the power supply 344 is at a positive polarity, the current flow to the input terminal 322ₐ due to the positive polarity signal on the terminal 340ₐ, is opposite in direction to the current flow to the terminal 322ₐ due to the negative polarity video signals which are coupled to the terminal 330ₐ during the video receiving portion of the cycle. A negative polarity gate control signal is applied to the gate input terminal 366ₐ only during the video receiving period, and a ground potential is applied to the gate input terminal 366ₐ during the reset period in the preferred embodiment. Therefore, in the preferred embodiment, the only current supplied to the input terminal 322ₐ during the reset period is the current supplied through the diode 334.

The terminals 125 through 147 of FIG. 1 correspond to the terminal 340ₐ of FIG. 3. The terminals 150 through 172 of FIG. 1 correspond to the terminal 366ₐ of FIG. 3. The capacitors 174 through 196 correspond to the capacitor 314 of FIG. 3. The amplifiers 102 through 124 of FIG. 1 correspond to the amplifier 312 of FIG. 3.

The current supplied to the terminal 322ₐ through the diode 334 tends to reverse the charge on the capacitor 314. The diode 332, however, becomes forward-biased as the potential on the input terminal 322ₐ becomes positive, and this holds the plates 316 and 318 of the capacitor 314 to a potential difference level equal to the forward voltage drop of the diode 322 following discharge of the capacitor 314. The diode 332, therefore, prevents the capacitor 314 from acquiring any substantial charge with a polarity opposite to the polarity that results from the video signal.

By way of illustration, no limitation being intended, representative values and types of components suitable for the circuit of FIG. 3 are listed in the following table:

Diodes

| | |
|---|---|
| 328 | TI71 |
| 332 | TI71 |
| 334 | TI71 |
| 338 | 1N461 |

Transistor

| | |
|---|---|
| 46 | 2N1499B |

Capacitor

| | | |
|---|---|---|
| Capacitor | microfarad | 0.08 |

Voltages

| | |
|---|---|
| +V1 | +15 |
| +V2 | +2 |
| +V3 | +15 |
| −V4 | −15 |

Signal Levels

| | |
|---|---|
| Reset | −1.2 volts to 12 volts |
| Information | 0 volt to −11 volts |
| Gate | 0 volt to −7 volts |
| Output | −0.2 volt to 10 volts |

Resistors

| | Ohms |
|---|---|
| 24 | 200 |
| 26 | 200 |
| 42 | 12K |
| 58 | 5.1K |
| 60 | 15K |
| 64 | 5.6K |

The Schmitt trigger circuits 200 through 221 of FIG. 1 are coupled to the integrating circuits 56 through 78 by the resistors 222 through 243, respectively. The circuits for the signals $\overline{A3}$ through $\overline{A20}$ are not shown in FIG. 1, since they are identical to the circuits for the signals $\overline{A1}$ through $\overline{A22}$, which are shown in FIG. 1. The Schmitt trigger circuit, being a binary circuit, produces a square wave output signal whenever the video input signal to the Schmitt trigger circuit exceeds the threshold level of the Schmitt trigger circuit. The threshold level of the Schmitt trigger circuits 200 through 221 is not a fixed level but varies with a normalized signal level which represents the amount of the total image area which is covered by an imaged character, as will be described subsequently. A discussion of the use of a Schmitt trigger circuit as a squaring circuit is found in "Pulse and Digital Circuits," by Jacob Millman, Ph. D., and Herbert Taub, Ph. D., McGraw-Hill Book Company, Incorporated, New York, N.Y., United States of America, 1956, pages 164 to 173. The square wave output signals of the Schmitt trigger circuits 200 through 221 are converted by the "NAND" gate amplifiers 260 through 281 into digital logic level signals, and the resulting logic level signals are termed the "$A_N$" functions. The inverters 460 through 481 receive the "$A_N$" function signals and produce the "$\overline{A_N}$" function signals.

The integrating amplifier 124 is gated by the gate signal XXIII, which allows this amplifier to integrate and amplify the video signals which are present on line 45 during the complete scan of the total image area 34. The signal derived from the integrating amplifier 124, therefore, is proportional to the amount of the total image which is filled by an imaged character, and this signal, "$a_{total}$", is used as a video normalization signal. The output of the amplifier 124 is inverted by the Class A transistor amplifier 392, and the output of the amplifier 392 is therefore $$"\overline{a_{total}}"$$

The output of the amplifier 392 is inverted by the Class A transistor amplifier 393, and this output is, therefore, "$a_{total}$." Both the "$a_{total}$" and the $$"\overline{a_{total}}"$$

signals are used as normalization signals in deriving the "$A_N$," "$b_N$," and "$B_N$" function signals. The operating levels of Class A transistor amplifiers 392 and 393 are selected to insure that saturation of the amplifier does not occur and that the output voltage remains an analog voltage over the entire range of operation.

Figure 2:
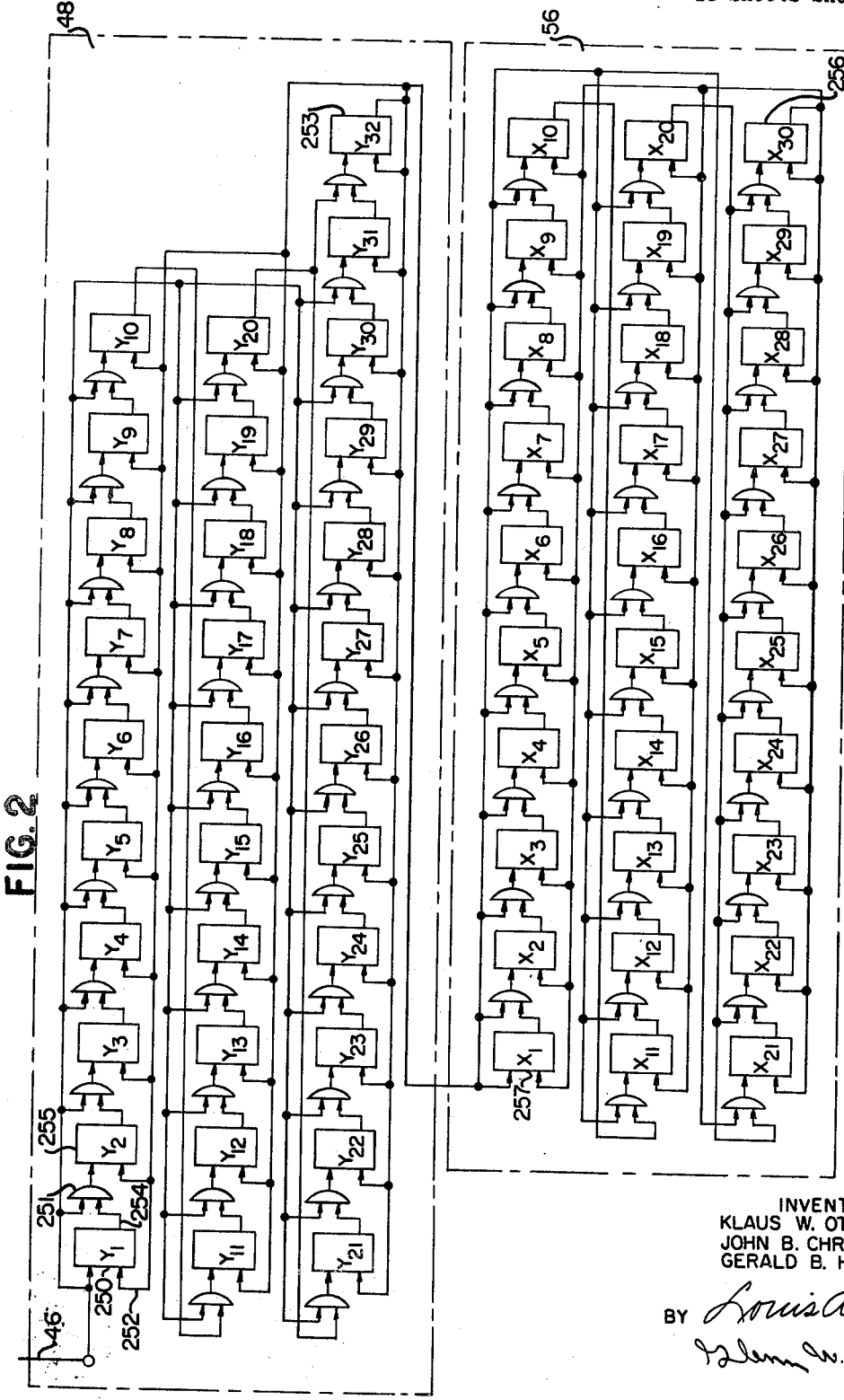
FIG. 2 is a diagrammatic illustration of the two-dimensional register employed by the reader.

FIG. 2 shows the y-register 48 with counting stages $y_1$ through $y_{32}$. The y-register 48 is constructed of thirty-two identical flip-flops, of which the flip-flop 250 is typical, and thirty-one "AND" gates, of which the gate 251 is typical. All of the flip-flops of the y-register 48 are initially reset by an input on the line 252, which is derived from the set side of the flip-flop 253 at the thirty-second stage of the y flip-flop register 48. The first input signal on the line 46 results in the setting of the flip-flop 250. Setting of the flip-flop 250 results in the reset ouput on the line 254 going to a "1" condition, thus satisfying one input condition of the "AND" gate 251. The second pulse input to the line 46 can now pass through the "AND" gate 251 to set the flip-flop 255. The flip-flop 250 is, therefore, set on the first input pulse to the input line 46, and the flip-flop 255 is set on the second input pulse to the input line 46. In a similar manner, each flip-flop of the y-register 48 is set by successive input pulses on the line 46. To prevent the complete chain of flip-flops in either of the two registers from being set simultaneously, each alternate "AND" gate that supplies set inputs to its respective flip-flop stage in both of the registers is supplied with alternate phases of a two-phase timing clock (not shown), as is common in the art. For example, when the "AND" gates supplying the even-numbered flip-flops, such as the flip-flop 250, are clocked on, the "AND" gates supplying the odd-numbered flips-flops, such as the flip-flop 255, are clocked off. At the end of thirty-two input pulses on the line 46, the flip-flop 253 sets, and the "1" output from the set side of the flip-flop 253 is applied to the reset inputs of all of the flip-flops in the y-register to clear out the y-register.

The x-register 50 of FIG. 2 is identical to the y-register 48, except that it has thirty stages instead of thirty-two and is connected to count only once for every thirty-two input pulses on the line 46. In this manner, a total of nine hundred and sixty input pulses on the line 46 is required to complete the count in the x-register. Upon completion of the count in the x-register, the last stage of the x-register resets the register, and the scan of the image area is completed.

Figure 4B:
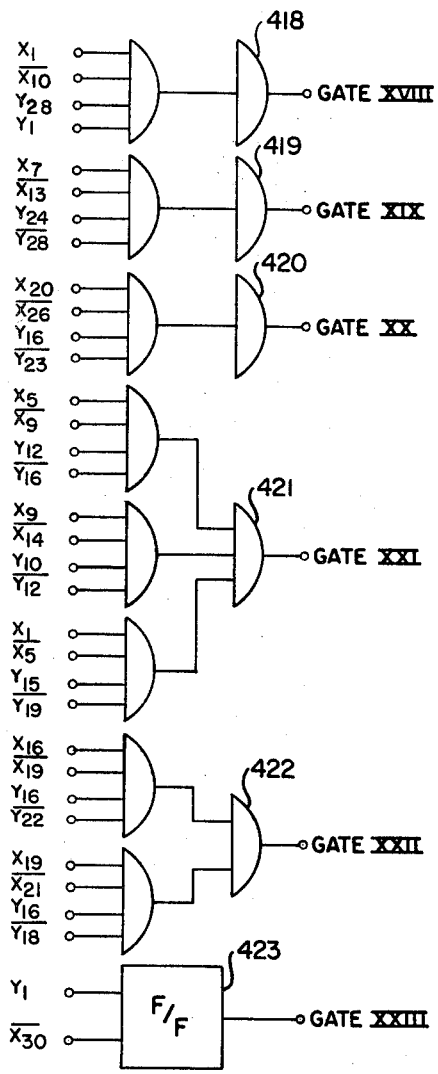
FIG. 4B is a diagrammatic illustration of a portion of the control gate logic of the reader for gate signals XVIII through XXIII.
Figure 5:
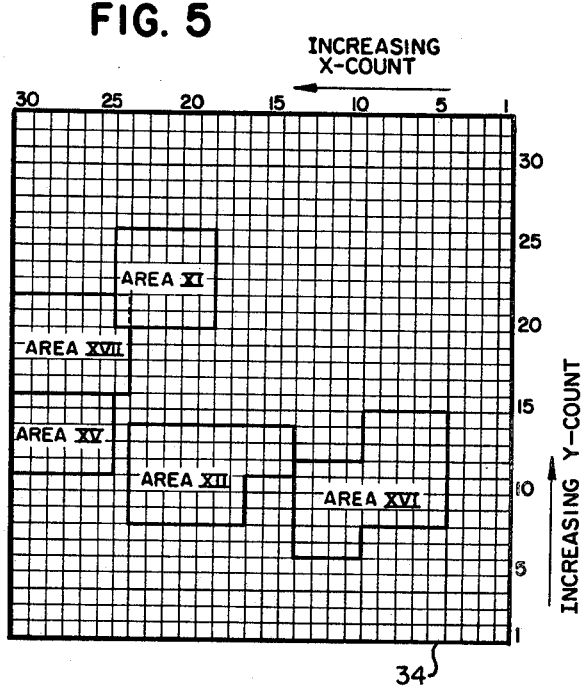
FIG. 5 is a sub-image area plot for sub-image areas XI, XII, XV, XVI, and XVII.
Figure 6:
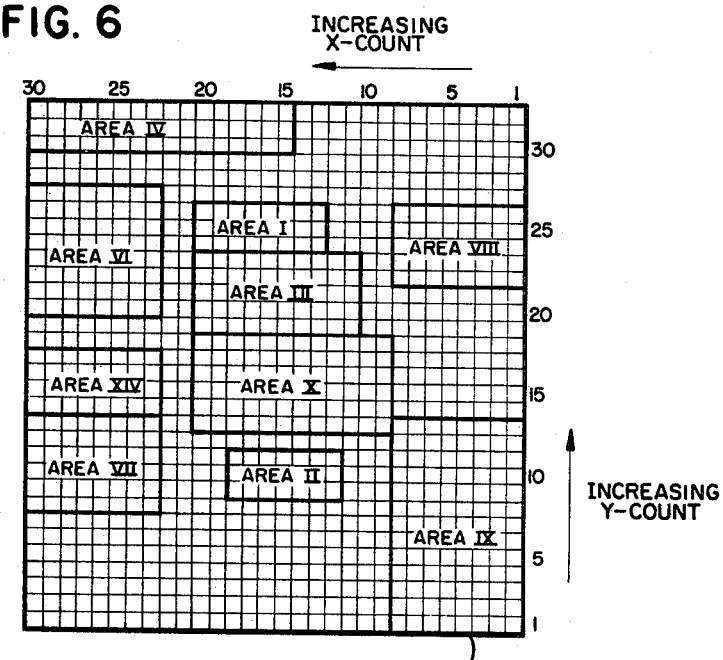
FIG. 6 is a sub-image area plot for sub-image areas I, II, III, IV, VI, VII, VIII, IX, X, and XIV.
Figure 7:
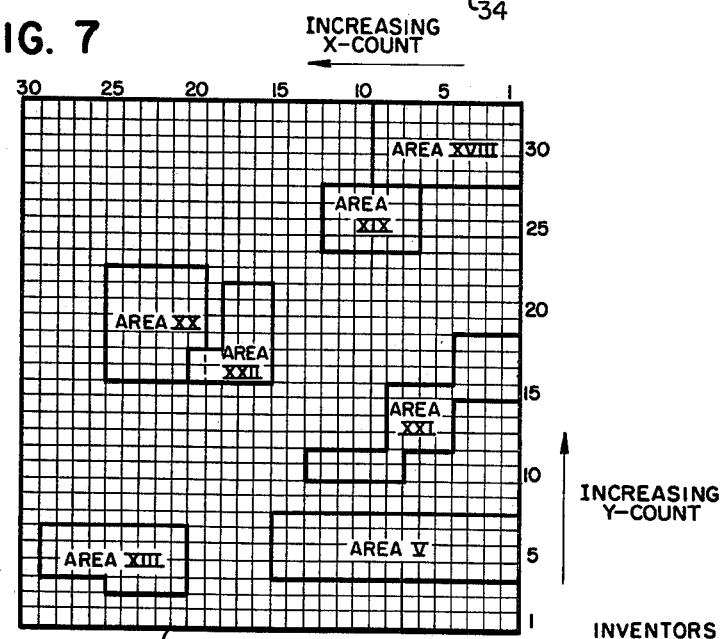
FIG. 7 is a sub-image area plot for sub-image areas V, XIII, XVIII, XIX, XX, XXI, and XXII.

FIGS. 4A and 4B show the gate control encoding circuits for the intergrating amplifier gates which use the y-register 48 and the x-register 50 to generate the electronic sub-image areas I through XXII of FIGS. 5, 6, and 7. FIG. 4A also illustrates a typical "NAND" gate inverter circuit 430, which is followed by a typical inverter 431. The inverters 401 through 422, of FIGS. 4A and 4B, produce logic level output signals, which are used as gate signals by the gates 70 through 100, respectively, of FIG. 1. The "NAND" gate 430 has four inputs, and, if these inputs are all in the true state, the "NAND" gate 430 will produce a false signal that signifies "$\overline{\text{sub-image area}}$;" that is, all areas but the sub-image area are then represented by the output signal of the "NAND" gate 430. If any input to the "NAND" gate 430 is false, the output of the "NAND" gate 430 is true, and the output signal from the "NAND" gate 430 then signifies "sub-image area." Since the inverter 431 is coupled to the output of the "NAND" gate 430, the meaning of the output of the inverter 431 is "sub-image area" only when all the inputs to the "NAND" gate 430 are true. The gate control circuits 401 through 422 corresponding to the gate signals I through IX are all "NAND" gates with inputs for "START X" and "START Y" derived from the true side of particular x- and y-register flip-flops, and "STOP X" and "STOP Y" inputs derived primarily from the false side of other x- and y-register flip-flops. In several instances, the "STOP X" and the "STOP Y" inputs are derived from the true side of a flip-flop in the x-register or the y-register. These inputs are necessary when the sub-image area extends to the boundary of the main image area. The four inputs to each "NAND" gate, therefore, produce gate signals I through IX which correspond to sub-image areas I through IX, respectively, of FIGS. 5, 6, and 7. Therefore, whenever the gate signals I through XXII are applied to their respective gate circuits, the associated integrating amplifiers pass video signals, and the areas I through XXII function as masks or sub-image areas.

Some of the sub-image areas in FIGS. 5, 6, and 7 overlap, and the sub-image areas XIII and XVI are both formed by the combination of two rectangular areas. The logic circuits used to obtain the necessary control signals for the gate signals XIII and XVI are shown in FIG. 4A. If the output of the "NAND" gate 398, for example, represents a "$\overline{\text{sub-image area } A}$" and the output of the "NAND" gate 399, for example, represents "$\overline{\text{sub-image area B}}$," then the output of the common "NAND" gate inverter 413 represents "sub-image area A or sub-image area B," since by De Morgan's theorem of Boolean algebra $\overline{A} \cdot \overline{B} = A + B$. Therefore, the sub-image areas associated with the gate signals XIII and XVI are the areas XIII and XVI, respectively, and each of these sub-image areas is derived from logic circuitry in the manner described, whereby the complete sub-image area is formed of two rectangular areas, each of which is associated with a separate "NAND" gate.

The gate signal XXIII is controlled by setting of the flip-flop 250 at the beginning of the scan period and the setting of the flip-flop 256 at the end of the scan period, and the gate signal XXIII, therefore, corresponds to the total image area 34 of FIG. 1. The gate signals XXI and XXII correspond to combinations of two rectangular areas, and the logic for generating the necessary signals is shown in FIG. 4B. Area XXI of FIG. 7 is a three-element area derived from a three-"NAND"-gate control circuit configuration, and area XXII is a two-element area derived from a two-"NAND"-gate control circuit configuration.

The normalization signal, $$"\overline{a_{total}}"$$

which is developed by the integrating amplifier 392 of FIG. 1, is applied to the resistors 370 through 391, which are coupled to the input of the Schmitt triggers 200 through 221, respectively. The resistors 370 through 391 each form one leg of a voltage-dividing network, with the resistors 222 through 243, which are coupled to the integrating amplifiers 102 through 123, respectively, forming the other leg of the voltage-dividing network.

Figure 10:
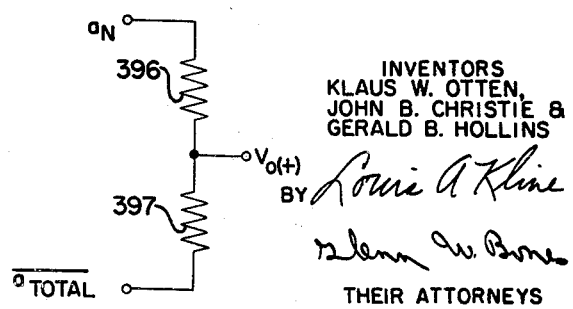
FIG. 10 is a schematic for the resistor voltage dividing networks for the "$A_N$" function Schmitt trigger circuit of FIG. 1.

FIG. 10 shows a typical voltage-dividing network which is identical to the resistor voltage-dividing networks that are shown at the input of the Schmitt trigger circuits 200 through 221 in FIG. 1. The resistor 396 of the voltage-dividing network of FIG. 10 corresponds to the resistors 222 through 243 of FIG. 1. The resistor 397 of FIG. 10 corresponds to the resistors 370 through 391 of FIG. 1. Since each "$a_n$" signal has a polarity that is opposite to the polarity of the $$"\overline{a_{total}}"$$

signal, the output voltage, "$V_o$," which appears at the junction of the resistor 396 and the resistor 397 is determined by the equation:

"$V_o$"=["$a_n$"·(Value of Resistor 397)+"$a_{\overline{total}}$"·(Value of Resistor 396)]/[(Value of Resistor 396) + (Value of Resistor 397)]

In the preferred embodiment, the Schmitt trigger circuits of FIG. 1 are designed to trigger when "$V_o$" is at a slightly positive potential level; for example, a triggering level of only fifty millivolts is used in the preferred embodiment. In this embodiment, the resistance values of the resistors 396 and 397 are so chosen that the Schmitt triggers of FIG. 1 will be triggered "ON," resulting in a "true" output on the logic circuit which is directly connected to the Schmitt trigger circuit, whenever the "$a_N$" signal present on the voltage-dividing network on the input of the Schmitt trigger circuit has a magnitude that exceeds approximately 3–10% of the "$a_{total}$" signal level. Thus, when the "$a_{\overline{total}}$"

signal increases in magnitude, an associated Schmitt trigger circuit that is triggered "ON" will continue to be triggered "ON" only if the "$a_N$" signal also increases in magnitude sufficiently. In this manner, the digital logic circuits coupled to the Schmitt trigger circuits of FIG. 1 are able to produce "$A_n$" signals that are normalized with respect to the "$a_{total}$" signal level. In the preferred embodiment, the resistors 222 through 243 have a value of 1.5K ohms, and the resistors 370 through 391 have a value of 5.1K ohms. A logic level "$A_N$" signal is, therefore, produced by the logic circuits that are coupled to the Schmitt trigger circuits of FIG. 1 whenever the "$a_n$" signal has a magnitude that exceeds approximately 3–10% of the "$a_{total}$" signal level.

In addition to the "$a_N$" and the "$A_N$" functions, the present reader employs functions which are termed the "$b_N$" and the "$B_N$" functions are a measure of configuration comparison between various portions of the unknown characters that are to be identified. For example, left-to-right similarity is high for an "8" and low for a "7," while top-to-bottom similarity is high for a "3" and low for a "2." A signal that represents the difference between the right segment and the left segment of an unknown character will approach a zero value for an "8" but not for a "7." Similarly, a signal that represents the difference between the top and bottom portions of an unknown character will approach a zero value for a "3" but not for a "2."

The various sub-image areas in the preferred embodiment that are located at various places in the reference image area are all selected to provide "$a_N$" signals in such a way that similarities of various portions of the numerals "1" through "9" and "0" are represented by the "$b_N$" function signals. In the described embodiment, some "$a_N$" function signals are derived from two sub-image areas.

In deriving a "$b_N$" function from two "$a_N$" functions, a summation is performed at the associated "$b_N$" function generating amplifier. This is accomplished by replacing an input resistor suitable for a single input signal with resistors having two or three times the value of the single input resistor, according to the number of inputs to be summed. The net current into the summing node, thereby, remains the same as for the single input case.

The particular resistance values employed are determined to supply the sensing amplifier with current signals within the range of Class A amplification of the amplifier. The typical "$b_N$" function generating summing amplifier of FIG. 21 has two sets of terminals. One set is marked "—," and the other is marked "+." Input signals which appear on the "—" terminal are inverted by the summing amplifier, and input signals which appear on the "+" terminal are not inverted by the summing amplifier.

Figure 21:
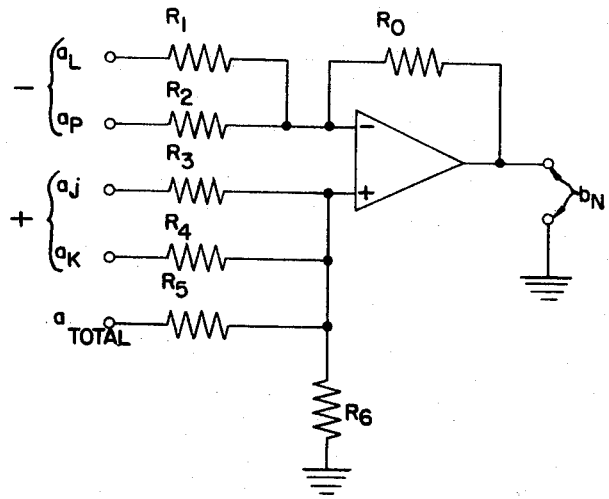
FIG. 21 is a schematic of a typical "$b_N$" function summing amplifier.

In the typical summing amplifier of FIG. 21, as used in the preferred embodiment, the resistors $R_1$ and $R_2$ are equal in value, and the resistors $R_3$ and $R_4$ are equal in value. The resistance value of the resistor $R_5$ is approximately ten times as large as the resistance value of the parallel combination of the resistors $R_3$ and $R_4$, and, therefore, the value of the resistor $R_5$ has only a very small effect on the input current supplied to the positive terminal of the summing amplifier. The value of the parallel combination of the resistors $R_1$ and $R_2$ is approximately 1.6 times the value of the parallel combination of the resistors $R_3$ and $R_4$.

The following table illustrates some typical values for the summing amplifier of the preferred embodiment.

Resistors

| | |
|---|---|
| $R_0$ | 13K |
| $R_1$ | 24K |
| $R_2$ | 24K |
| $R_3$ | 15K |
| $R_4$ | 15K |
| $R_5$ | 75K |
| $R_6$ | 62K |

Figure 8A:
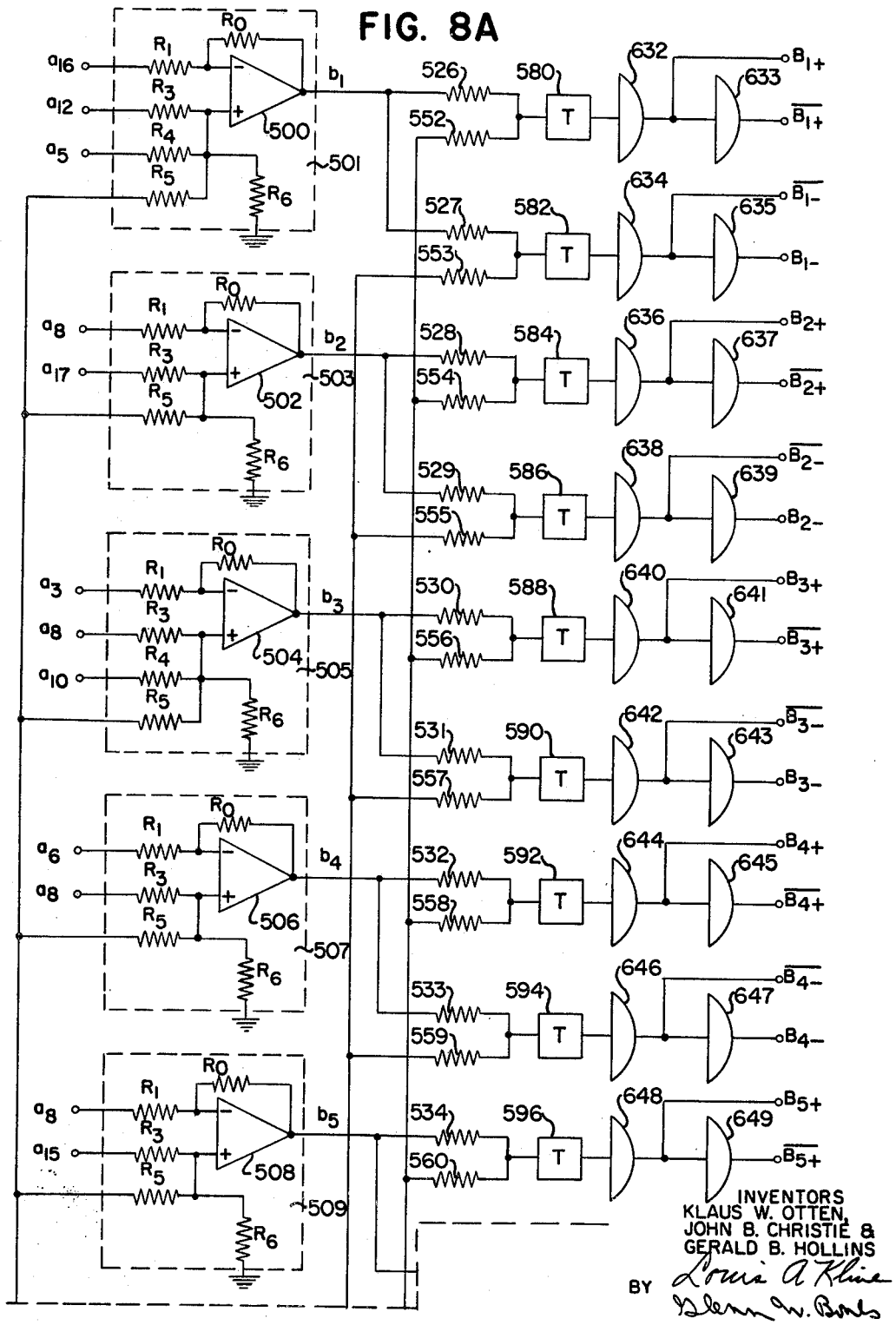
FIG. 8A is a diagrammatic illustration of the "$b_N$" and the "$B_N$" function signal generation portion of the reader for "$B_N$" function "$B_1$" through "$B_5$."
Figure 8C:
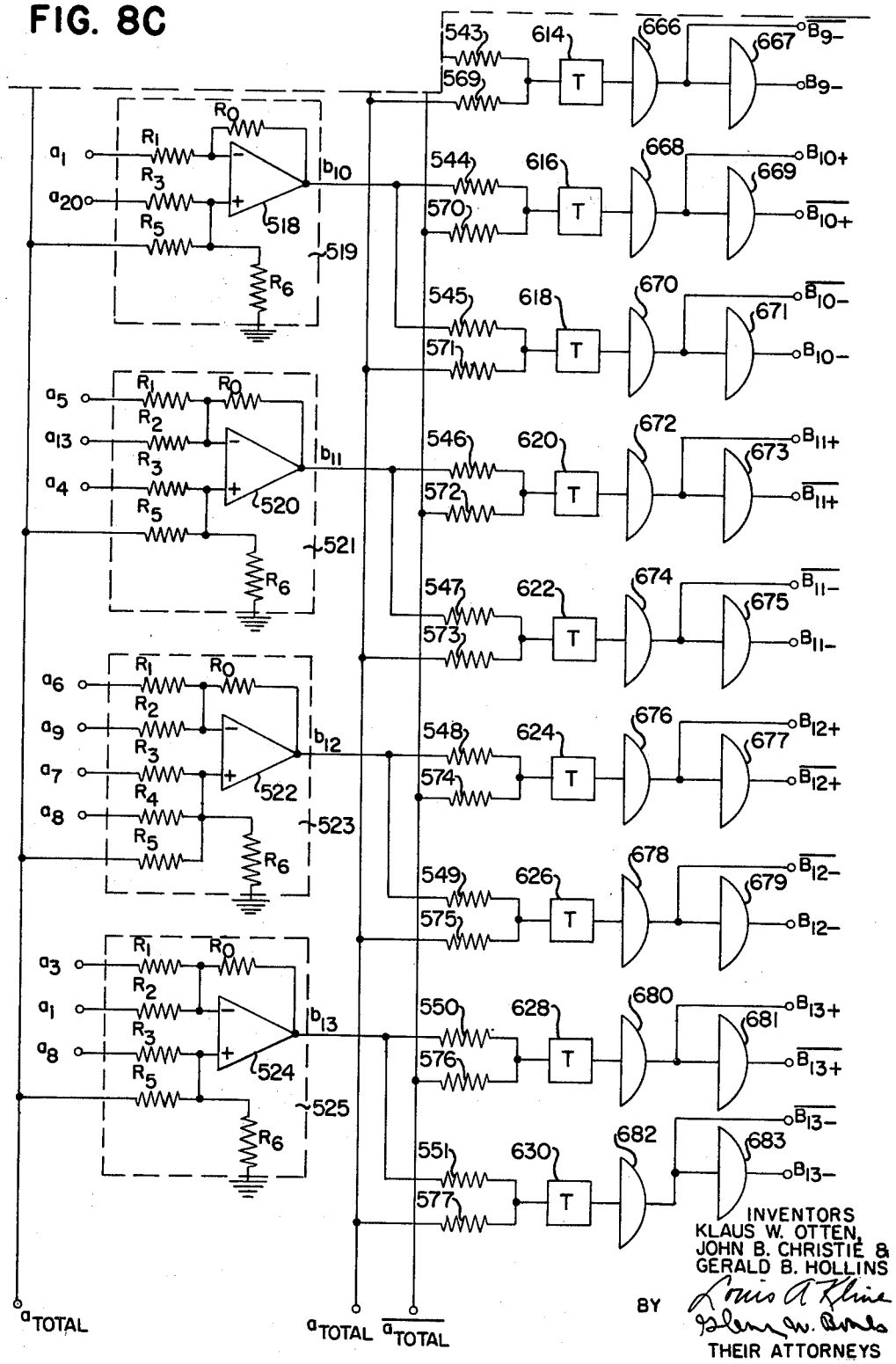
FIG. 8C is a diagrammatic illustration of the "$b_N$" and the "$B_N$" function signal generation portion of the reader for "$B_N$" functions "$B_{10}$" through "$B_{13}$."
Figure 12:
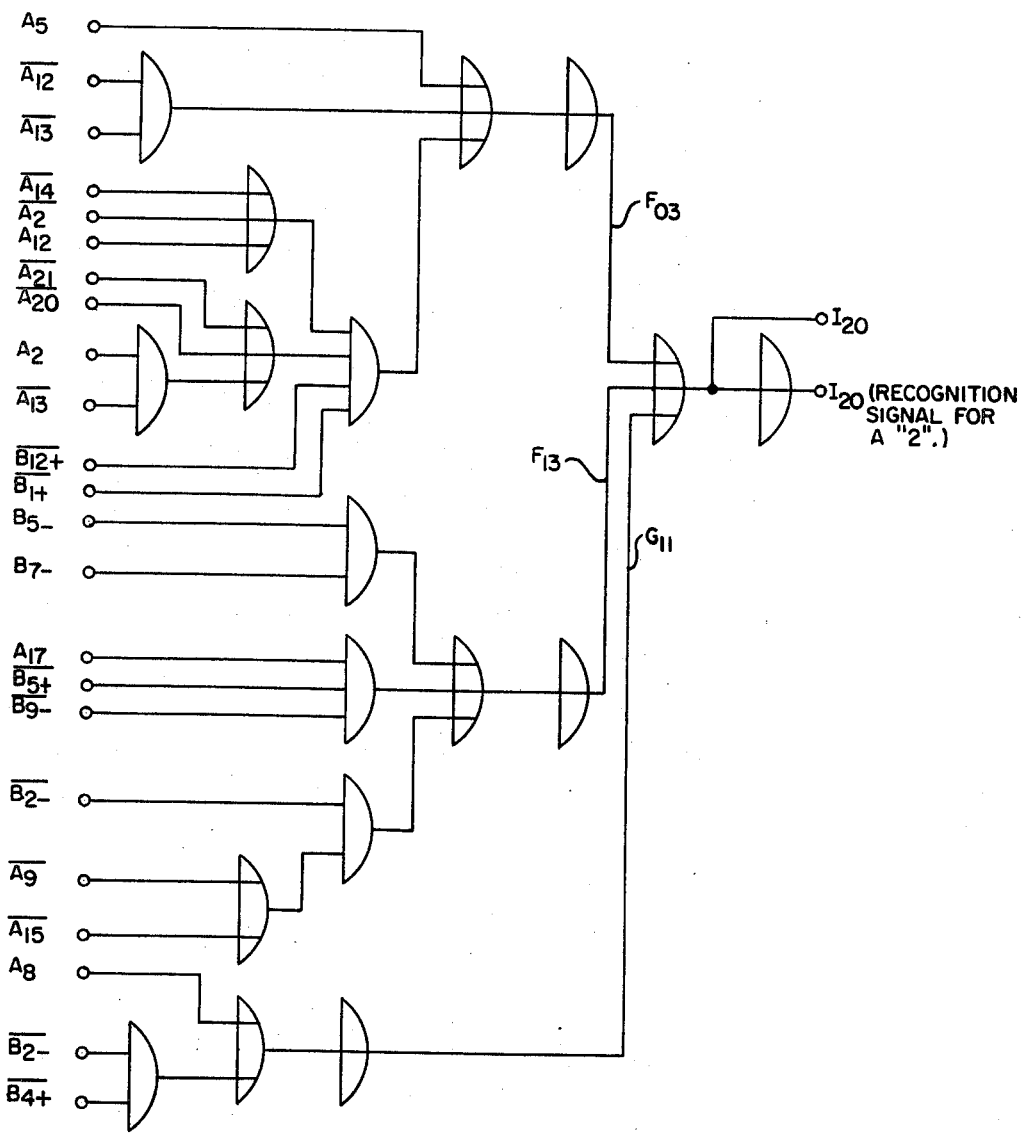
FIG. 12 is a diagrammatic illustration of the recognition logic circuit for a "2."
Figure 13:
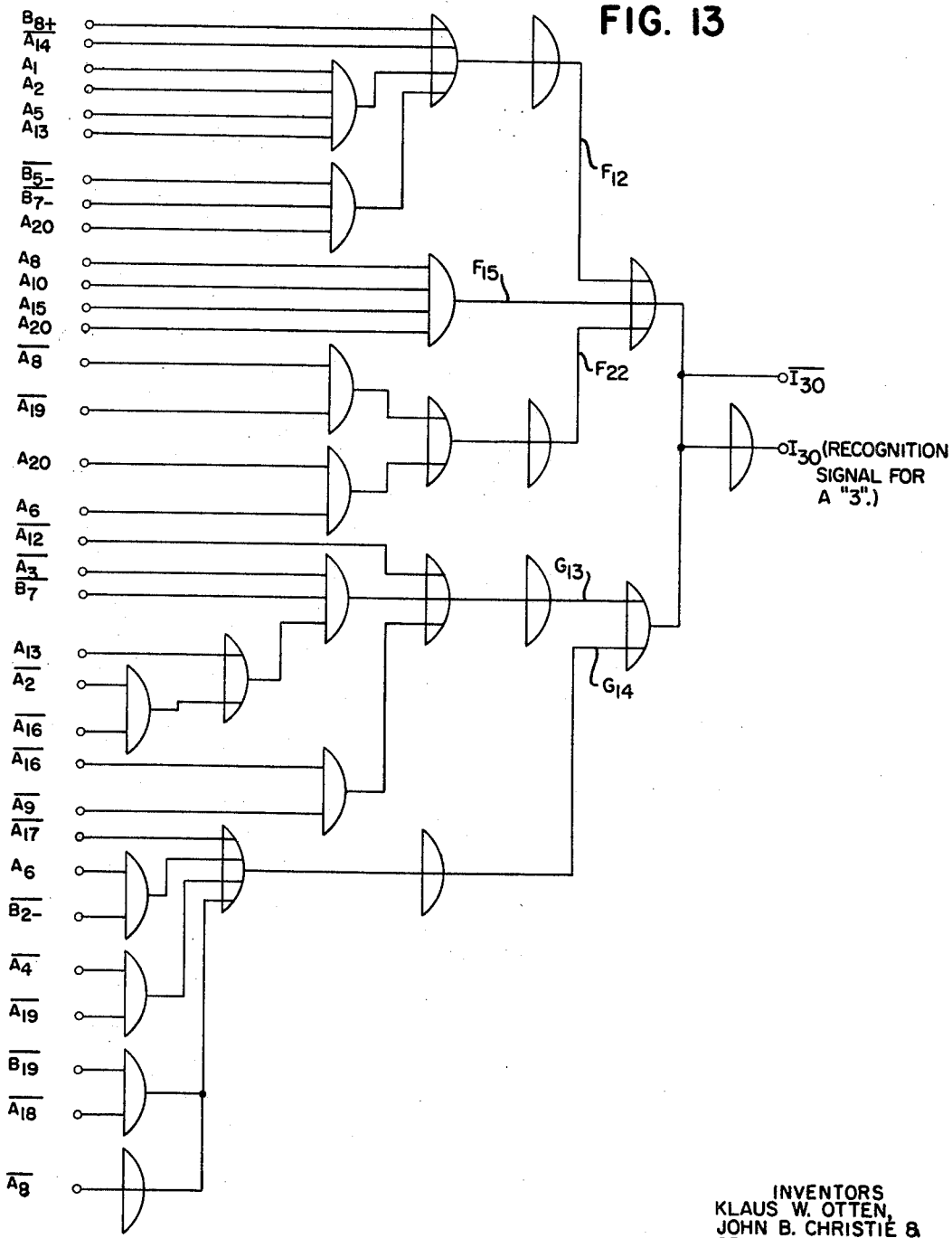
FIG. 13 is a diagrammatic illustration of the recognition logic circuit for a "3."
Figure 14:
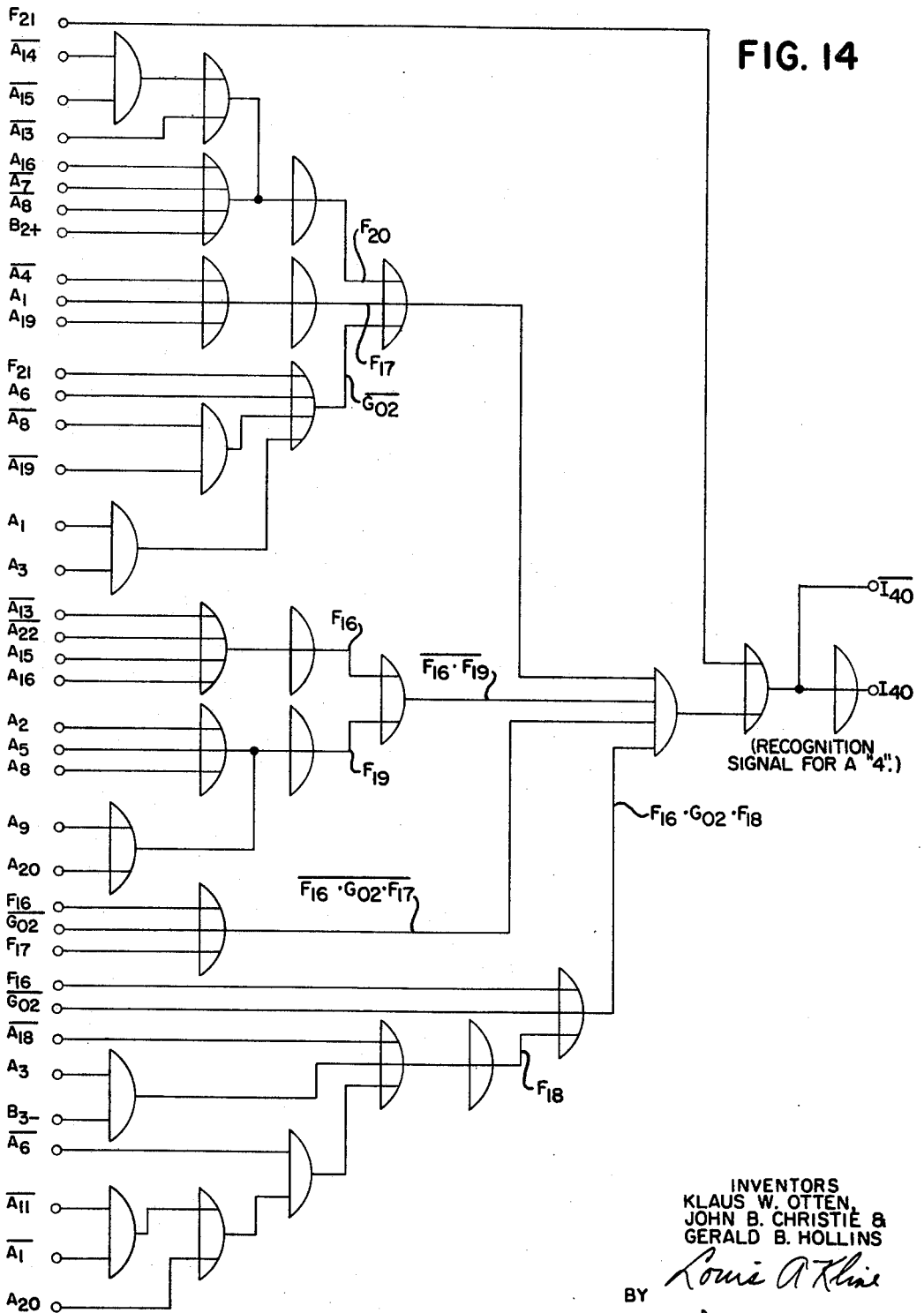
FIG. 14 is a diagrammatic illustration of the recognition logic circuit for a "4."
Figure 15:
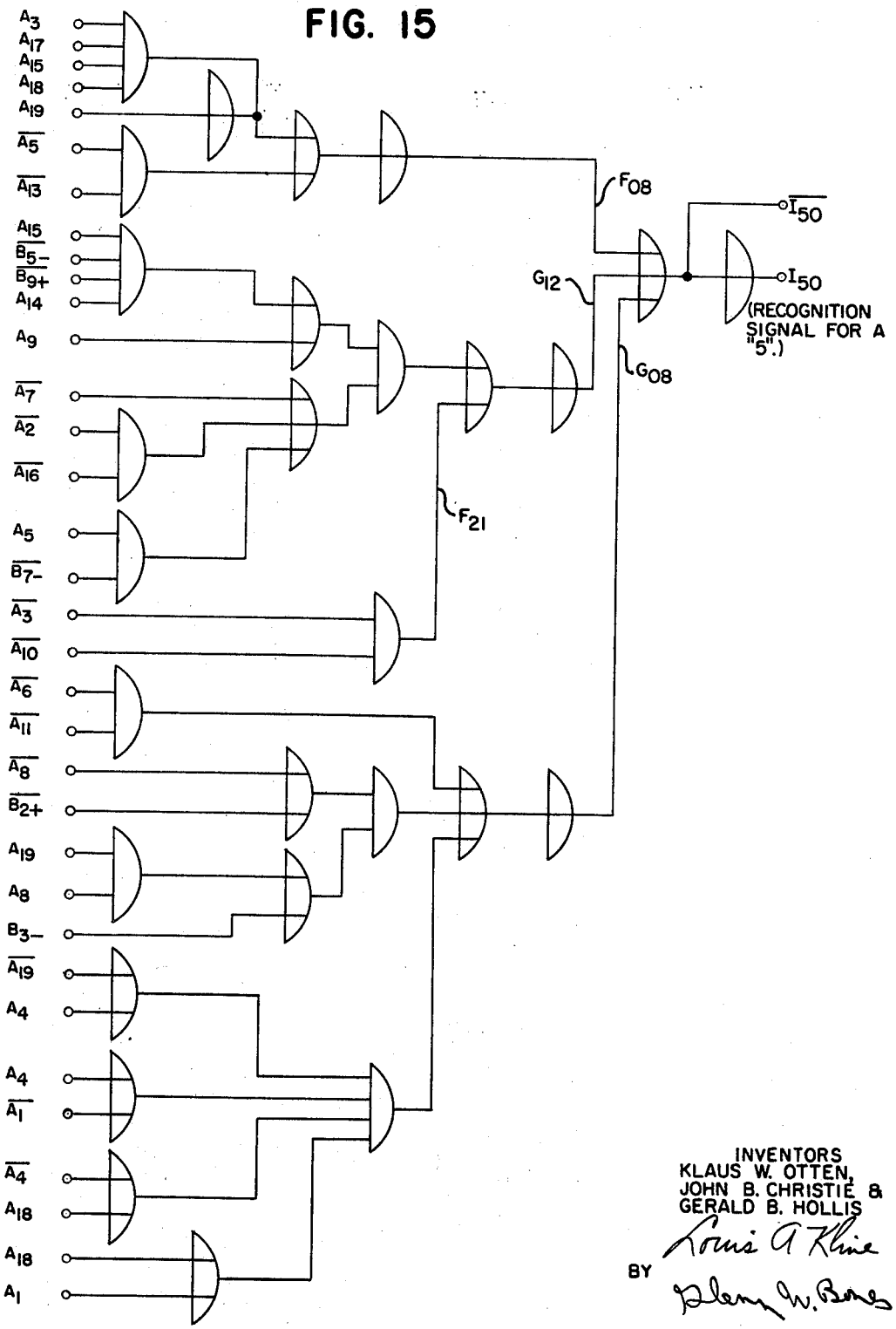
FIG. 15 is a diagrammatic illustration of the recognition logic circuit for a "5."
Figure 16:
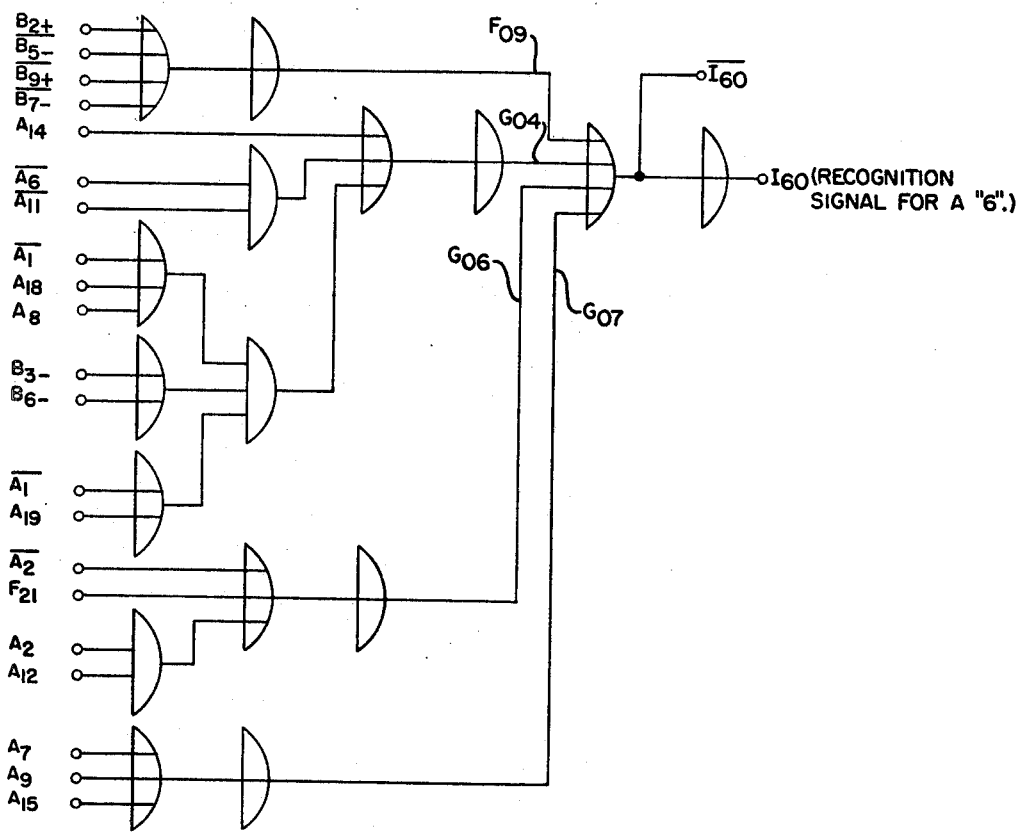
FIG. 16 is a diagammatic illustration of the recognition logic circuit for a "6."
Figure 17:
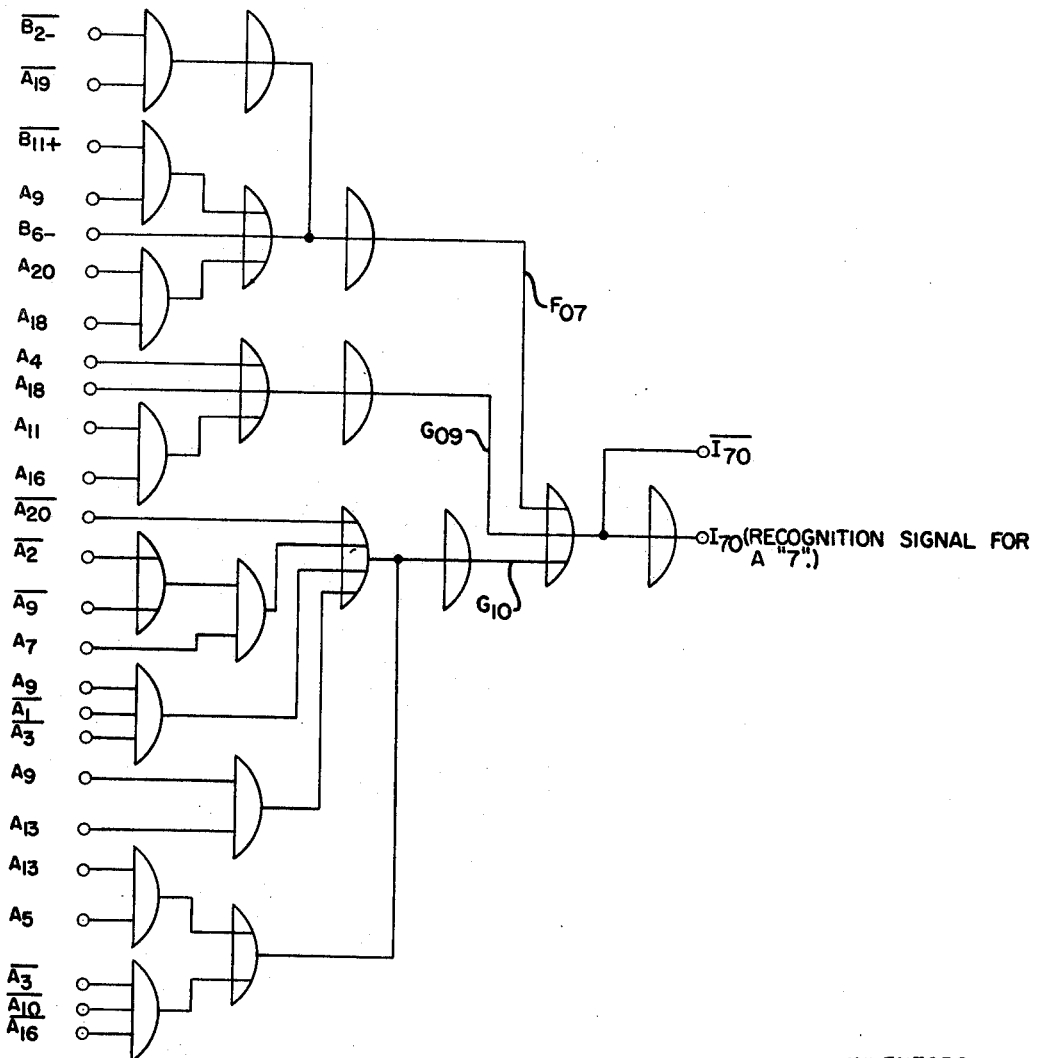
FIG. 17 is a diagrammatic illustration of the recognition logic circuit for a "7."
Figure 18:
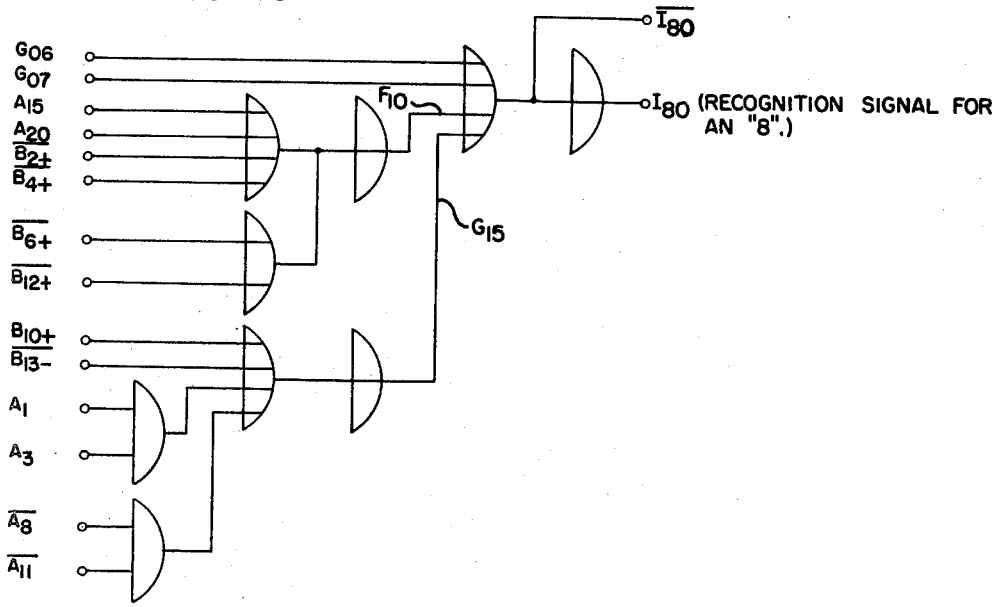
FIG. 18 is a diagrammatic illustration of the recognition logic circuit for an "8."
Figure 19:
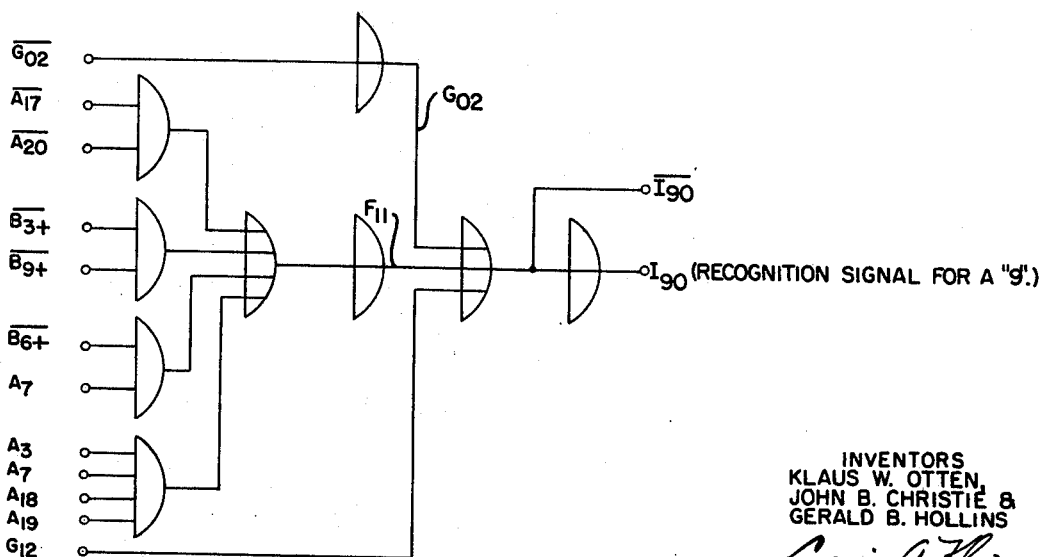
FIG. 19 is a diagrammatic illustration of the recognition logic circuit for a "9."
Figure 20:
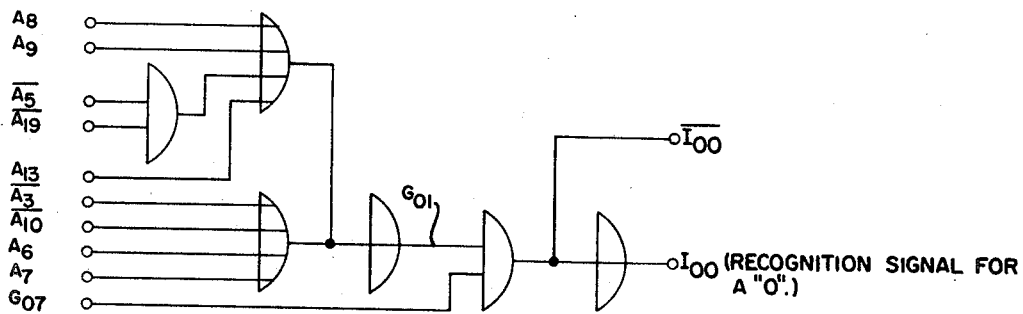
FIG. 20 is a diagrammatic illustration of the recognition logic circuit for a "0."

FIGS. 8A, 8B, and 8C show the "$b_N$" summing amplifier of the present reader. All of the summing amplifiers are similar to the typical summing amplifier of FIG. 21. The only differences between the summing amplifiers of FIGS. 8A, 8B, and 8C and the typical summing amplifier of FIG. 21 is that some of the amplifiers of FIGS. 8A, 8B, and 8C replace the parallel combination of resistors $R_1$ and $R_2$ by a single resistor which is equal in value to one half the value of resistor $R_1$, and some replace the parallel combination of resistors $R_3$ and $R_4$ by a single resistor which is equal in value to one half the value of resistor $R_3$. The resistors $R_0$, $R_5$, and $R_6$ are the same in all of the amplifiers of FIGS. 8A, 8B, and 8C and in the typical amplifier of FIG. 21. The gain of the summing amplifiers is controlled to produce maximum output voltages of approximately 11 volts when maximum input voltages of approximately 11 volts are applied.

The values for the resistors employed in conjunction with the summing amplifiers of FIGS. 8A, 8B, and 8C in the preferred embodiment of the present invention are all similar. In all of the summing amplifiers 501 through 525, $R_5$ has a value of 75 kilohms, and $R_6$ has a value of 6.2 kilohms. Where $R_1$ appears alone, its value is 12 kilohms. Where $R_1$ and $R_2$ both appear, each has a value of 24 kilohms. Where $R_3$ appears alone, it has a value of 7.5 kilohms. Where $R_3$ and $R_4$ both appear, each has a value of 15 kilohms.

Figure 9:
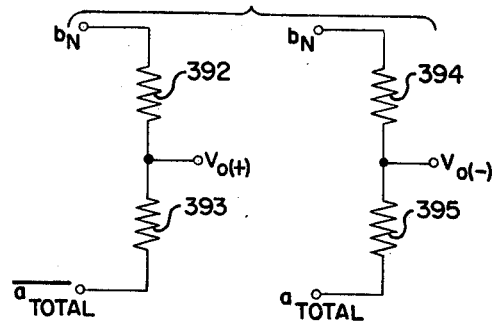
FIG. 9 is a schematic for the resistor voltage dividing networks for the "$B_N$" function Schmitt trigger circuits of FIGS. 8A, 8B, and 8C.

The "$b_N$" function signals which are developed by the circuits of FIGS. 8A, 8B, and 8C are applied to voltage-dividing networks on the inputs to a number of Schmitt trigger circuits. The Schmitt trigger circuits and the voltage-dividing networks associated with the "$b_N$" functions are similar to the Schmitt trigger circuits and the voltage-dividing networks that are associated with the "$A_N$" functions. In fact, the Schmitt trigger circuits 580, 584, 588, 592, 596, 600, 604, 608, 612, 616, 620, 624, and 628 are connected to voltage-dividing networks which are identical to the voltage-dividing networks of FIG. 1 that are associated with the "$a_N$" functions. The resistors 526 through 551 in the preferred embodiment have a value of 1.5K. The resistors 552 through 577 have a value of 5.1K. The resistors 392 and 393 of FIG. 9 illustrate a typical voltage-dividing network which is identical to the voltage-dividing network of FIG. 10 in the preferred embodiment, although, of course, in other embodiments the values of these two voltage-dividing networks may be different. The typical voltage-dividing network of FIG. 9, consisting of the resistors 393 and 392, with the resistor 393 being connected to the "$a_{\overline{total}}$"

signal, produces a positive output signal "$V_o$" whenever the "$b_N$" signal is of the same polarity as the "$a_{total}$" signal and has a magnitude that exceeds approximately 3–10% of the "$a_{total}$" signal level. The voltage divider of FIG. 10, represented by the resistors 395 and 394, is identical to the voltage divider represented by the resistors 392 and 393, except for the fact that the signal connected to the resistor 395 is "$a_{total}$" instead of $$"\overline{a_{total}}"$$

The effect of this is to produce a negative polarity "$V_o$" signal at the junction of the resistors 394 and 395 whenever the "$b_N$" signal on the resistor 394 is of a polarity opposite to the polarity of the "$a_{total}$" signal and has a magnitude that exceeds approximately 3–10% of the "$a_{total}$" signal level. When the "$V_o$" signal becomes negative, it triggers "off" any of the Schmitt trigger circuits that are coupled to receive the "$V_o$" signal.

The logic circuits connected to the output of the Schmitt trigger circuits of FIGS. 8A, 8B, and 8C convert the output of the Schmitt trigger circuits into logic level "$B_N$" function signals. The Schmitt trigger circuits which are connected to a voltage-dividing network that is coupled to receive the $$"\overline{a_{total}}"$$

signal are connected to logic circuits that produce a "true" signal whenever the "$b_N$" signal is of the same polarity as the "$a_{total}$" signal and has a magnitude that exceeds approximately 3–10% of the "$a_{total}$" signal level. The "true" state of the logic signal produced by the logic gate 632 is called the "$B_{1+}$" signal, and the other corresponding logic gates produce the other "$B_{N+}$" signals. The second row of logic circuits connected to the Schmitt trigger circuits of FIGS. 8A, 8B, and 8C (for example, the logic gate 633) invert the "$B_{N+}$" signals to produce the $$"\overline{B_{N+}}"$$

signals.

The Schmitt trigger circuits which are connected to a voltage-dividing network which is coupled to receive the "$a_{total}$" signal produce signals which are converted to $$"\overline{B_{N-}}"$$

logic level signals by the associated logic gates whenever the "$b_N$" signal is of opposite polarity to the "$a_{total}$" signal and has a magnitude that exceeds approximately 3–10% of the "$a_{total}$" signal level. The logic gate 634, which is coupled to the Schmitt trigger circuit 582, produces a signal that signifies $$"\overline{B_{1-}}"$$

The second row of logic gates connected to receive the $$"\overline{B_{N-}}"$$

signals invert these signals into "$B_{N-}$" signals.

A "$B_{N+}$" signal may be produced only when the sum of the "$a_N$" signals on the "+" input terminals of the associated differential input summing amplifier exceeds the sum of the "$a_N$" signals on the "−" input terminals of the amplifier by a predetermined amount. Similarly, a $$"\overline{B_{N-}}"$$

signal may be produced only when the sum of the "$a_N$" signals on the "−" input terminals of the associated differential input summing amplifier exceeds the sum of the "$a_N$" signals on the "+" input terminal of the amplifier by a predetermined amount.

Reference may be made to the aforementioned "Handbook of Operational Amplifier Applications" for a general discussion of summing amplifiers of the differential input type such as those employed in the present invention.

The G equations in the following list of equations are derived from the "$A_N$" and "$B_N$" functions and the F equations. The F equations are derived from the "$A_N$" and "$B_N$" functions. The I equations, or recognition equations, are functions of the F and G equations.

This may be summarized mathematically as $$F = f(A_N, B_N)$$
$$G = f(A_N, B_N, F)$$
$$I = f(F, G)$$

The symbol "+" means an "OR" function, and the symbol · means an "AND" function, in the following equations. Bracketed quantities are algebraically grouped together.

G Equations $G_{01} = \overline{A}_3 \cdot \overline{A}_{10} \cdot A_6 \cdot A_7 \cdot A_8 \cdot A_9 \cdot A_{17} \cdot (A_5 + A_{19})$ $G_{02} = A_6 \cdot (\overline{A}_1 + \overline{A}_3) \cdot (A_8 + A_{19}) \cdot F_{21}$ $G_{04} = A_{14} \cdot (A_6 + A_{11}) \cdot (\overline{A}_8 + \overline{A}_1 \cdot A_{18} + B_{3-} \cdot B_{6-} + \overline{A}_1 \cdot A_{19})$ $G_{06} = \overline{A}_2 \cdot F_{21} \cdot (\overline{A}_2 + \overline{A}_{12})$ $G_{07} = A_7 \cdot A_9 \cdot A_{15}$ $G_{08} = (A_6 + A_{11}) \cdot (A_4 \cdot \overline{A}_1 + A_4 \cdot \overline{A}_{19} + \overline{A}_4 \cdot A_{18} + A_1 \cdot A_{18}) \cdot (\overline{A}_8 \cdot \overline{B}_{2+} + \overline{A}_{19} \cdot B_{3-})$ $G_{09} = A_4 \cdot A_{18} \cdot (\overline{A}_{11} + \overline{A}_{16})$ $G_{10} = \overline{A}_{20} \cdot (\overline{A}_7 + \overline{A}_2 \cdot \overline{A}_9) \cdot (\overline{A}_9 + A_1 + A_3) \cdot (\overline{A}_9 + \overline{A}_{13}) \cdot (\overline{A}_{13} + \overline{A}_5) \cdot (A_3 + A_{10} + A_{16})$ $G_{11} = A_8 \cdot (B_{2-} + B_{4+})$ $G_{12} = F_{21}[A_9 \cdot (A_{15} + B_{5-} + B_{9+} + \overline{A}_{14}) + \overline{A}_7 \cdot (A_2 + A_{16}) \cdot (\overline{A}_5 + B_{7-})]$ $G_{13} = (A_{16} + A_9) \cdot [B_{7-} + A_3 + A_{13} \cdot (A_2 + A_{16})] \cdot \overline{A}_{12}$ $G_{14} = \overline{A}_{17} \cdot (\overline{A}_6 + B_{2-}) \cdot (A_4 + A_{19}) \cdot (A_{18} + A_{19})$ $G_{15} = (\overline{A}_1 + \overline{A}_3) \cdot (A_8 + A_{11}) \cdot B_{10+} \cdot \overline{B}_{13-}$

F Equations $F_{02} = \overline{A}_7 \cdot \overline{A}_{13} \cdot \overline{A}_{15} \cdot \overline{A}_{17} \cdot A_5 \cdot A_{21} \cdot A_{19} \cdot B_{5-} \cdot (A_4 + A_1)$ $F_{03} = A_5 \cdot (A_{12} + A_{13}) \cdot [B_{12+} + B_{1+} + \overline{A}_{14} \cdot \overline{A}_2 \cdot A_{12} + \overline{A}_{21} \cdot \overline{A}_{20} \cdot (\overline{A}_2 + A_{13})]$ $F_{04} = \overline{A}_8 \cdot (\overline{A}_{15} + \overline{A}_{17}) \cdot \overline{A}_{18} \cdot A_1 \cdot A_2 \cdot A_3 \cdot A_5 \cdot (A_{13} + B_{1+}) \cdot (\overline{A}_9 + \overline{A}_{17})$ $F_{07} = (B_{2-} + A_{19}) \cdot \overline{B}_{6-} \cdot \overline{B}_{8-} \cdot (B_{11+} + A_9) \cdot (\overline{A}_{20} + \overline{A}_8)$ $F_{08} = (A_5 + A_{13}) \cdot (\overline{A}_3 + \overline{A}_7 + \overline{A}_{15} + \overline{A}_{18} + \overline{A}_{19})$ $F_{09} = B_{2+} \cdot \overline{B}_{5-} \cdot \overline{B}_{9+} \cdot \overline{B}_{7-}$ $F_{10} = A_{15} \cdot A_{20} \cdot \overline{B}_{2+} \cdot \overline{B}_{4+} \cdot \overline{B}_{6+} \cdot \overline{B}_{12+}$ $F_{11} = (A_{17} + A_{20}) \cdot (B_{3+} + B_{9+}) \cdot (B_{6+} + \overline{A}_7) \cdot (\overline{A}_3 + \overline{A}_7 + \overline{A}_{18} + \overline{A}_{19})$ $F_{12} = \overline{B}_{8+} \cdot (\overline{A}_1 + \overline{A}_2 + \overline{A}_5 + \overline{A}_{13}) \cdot \overline{A}_{14} \cdot (B_{5-} + B_{7-} + \overline{A}_{20})$ $F_{13} = (\overline{A}_9 \cdot \overline{A}_{15} + B_{2-}) \cdot (\overline{A}_{17} + B_{5+} + B_{9-}) \cdot (\overline{B}_{5-} + \overline{B}_{7-})$ $F_{15} = (\overline{A}_8 + \overline{A}_{10} + \overline{A}_{15} + \overline{A}_{20})$ $F_{16} = \overline{A}_{13} \cdot \overline{A}_{22} \cdot A_{15} \cdot A_{16}$ $F_{17} = \overline{A}_4 \cdot A_1 \cdot A_{19} \cdot (\overline{A}_6 + B_{3+})$ $F_{18} = \overline{A}_{18} \cdot (A_{20} \cdot A_{11} + A_6) \cdot (\overline{A}_3 + \overline{B}_{3-})$ $F_{19} = A_2 \cdot A_5 \cdot A_8 \cdot A_9 \cdot A_{20}$ $F_{20} = \overline{A}_{13} \cdot A_{16} \cdot (A_{14} + A_{15}) \cdot \overline{A}_7 \cdot \overline{A}_8 \cdot B_{2+}$ $F_{21} = A_3 + A_{10}$ $F_{22} = (A_8 + A_{19}) \cdot (\overline{A}_{20} + \overline{A}_6)$

I Equations $$I_{10} = F_{02} + F_{04}$$

$$I_{20} = F_{03} \cdot F_{13} \cdot G_{11}$$

$$I_{30} = F_{12} \cdot F_{15} \cdot G_{13} \cdot G_{14} \cdot F_{22}$$

$$I_{40} = F_{21} \cdot (F_{20} \cdot F_{17} \cdot \overline{G}_{02} + F_{16} \cdot F_{19} + F_{16} \cdot \overline{G}_{02} \cdot F_{17} + F_{16} \cdot \overline{G}_{02} \cdot F_{18})$$

$$I_{50} = F_{08} \cdot G_{08} \cdot G_{12}$$

$$I_{60} = F_{09} \cdot G_{04} \cdot G_{06} \cdot G_{07}$$

$$I_{70} = F_{07} \cdot G_{09} \cdot G_{10}$$

$$I_{80} = F_{10} \cdot G_{15} \cdot G_{06} \cdot G_{07}$$

$$I_{90} = F_{11} \cdot G_{02} \cdot G_{12}$$

$$I_{00} = G_{01} \cdot G_{07}$$

FIGS. 11 through 20 illustrates the implementation of the preceding equations with "NAND" gate circuitry. The drawings are illustrated to show "NAND" gates that perform "OR" functions and "NAND" gates that perform "AND" functions in achieving the final recognition equation. This method of illustration, it is believed, facilitates tracing of the implementation of the various recognition equations. However, it is to be emphasized that all of the recognition logic circuits in FIGS. 11 through 20 are structurally "NAND" gates.

The reader of the present invention may be modified to implement other types of difference emphasis equations than that of the preferred embodiment. For example, a pure difference function, approximated by $$\text{``}b_N\text{''} = \text{``}a_k\text{''} - \text{``}A_L\text{''}$$

may be implemented by removing the "$a_{\text{total}}$" signal component from the "$b_N$" function implementation equation and by adjusting resistance values of the summing amplifiers of FIGS. 8A, 8B, and 8C to produce simple differential amplification, as shown in the previously-mentioned Burr-Brown handbook. In addition, the normalization signals $$\text{``}a_{\overline{\text{total}}}\text{''}$$

and may be removed entirely, and the threshold levels of the Schmitt trigger circuits htat are employed may be set at a fixed level. Both of these modifications will produce a reader with satisfactory recognition for lower accuracy applications.

The reading technique of the present invention may be modified to include additional recognition features. For example, if the reader was employed in a multi-font environment where the width of the numeral "1" varied greatly from one font to the next, a recognition signal indicating that a narrow "1" was present could be digitized and coupled to the recognition logic circuitry of FIG. 11 to modify the "1" recognition process to include a digital representation of the narrow "1." Similarly, other types of recognition signals could be digitized for the other characters. For example, various numerals or characters may be combined into different groups by character analysis. Each group will then have a characteristic digitized signal which may be combined with the digital character recognition signals now produced by character reader to supply a recognition signal. Therefore, although the present reader is able to perform character recognition by itself, it is apparent that it may also serve as one functional unit in a more elaborate reading scheme employing a number of other functional units.

The preferred embodiment of the present invention employs one type of operational amplifier, an integrating operational amplifier, to produce output signals. Modification of the present invention within the scope and spirit of the present invention may be made by those skilled in the art by the substitution of operational amplifiers that sum, subtract, average, differentiate, or perform other types of mathematical operations in place of the integrating operational amplifiers of the present invention. The term "operational amplifier" as employed in this invention relates to amplifiers that include a D.C. amplification stage that has a negative feedback path with the feedback components being selected so that the output signal of the operational amplifier represents a mathematical operation that is performed on the input signal.

While the present invention has been described primarily with reference to the preferred embodiment, it will be understood by those skilled in the art that other embodiments of the present invention may be made without departing from the spirit and scope of the present invention.

What is claimed is:

1. A device for recognizing a data pattern having a predetermined definition, said data pattern being located in a reference domain that includes a plurality of reference sub-domains, comprising:
   (a) means to scan the reference domain to produce recognizable indications of the data pattern, and
   (b) means to sense the recognizable indications produced by the scanning means and to produce an input signal in response thereto, and
   (c) a plurality of operational amplifiers coupled to the sensing means, each operational amplifier being constructed to produce an output signal in response to the reception of an input signal from the sensing means, and
   (d) control means coupled to the plurality of operational amplifiers, said control means being constructed to selectively control the application of the input signal to each operational amplifier during selected portions of the scan, in correspondence with the plurality of reference sub-domains, and
   (e) means to produce a plurality of analog difference signals that are each a function of the difference between the sum of a first set of selected output signals and the sum of a second set of selected output signals, the first and second sets of selected output signals being selected to represent predetermined comparisons of the data located in various reference sub-domains, and
   (f) means to digitize the plurality of output signals and the plurality of difference signals and to logically combine the digitized output and difference signals into a digital recognition signal that represents the data pattern.

2. A device as in claim 1 wherein the data pattern is normalized with respect to size in the reference domain.

3. A device as in claim 2 wherein the plurality of operational amplifiers are integrating operational amplifiers.

4. A device as in claim 3 wherein the means to produce the plurality of analog difference signals are a plurality of differential input amplifiers.

5. A device as in claim 4 wherein the means to control the application of the input signal to the plurality of integrating operational amplifiers includes:
   (a) a two-dimensional register that is coupled to the scanning means, the scanning means being constructed to supply timing pulses to the two-dimensional register, and
   (b) digital logic means coupled to the two-dimensional register, the digital logic means being constructed to selectively control the application of the input signal to each of the integrating operation amplifiers during selected portions of the scan, in correspondence with the plurality of reference sub-domains, in accordance with the count in the two-dimensional register.

6. A device as in claim 5 wherein the means to digitize the plurality of output signals and the plurality of difference signals and to logically combine the digitized output and difference signals includes:
   (a) means to produce a plurality of first digital logic signals, each first digital logic signal being produced whenever an output signal exceeds an associated first threshold level, and
   (b) means to produce a plurality of second digital logic signals, each second digital logic signal being produced whenever a difference signal exceeds an associated second threshold level and the sum of the first set of selected output signals is greater than the sum of the second set of selected output signals, and
   (c) means to produce a plurality of third digital logic signals, each third digital logic signal being produced whenever a difference signal exceeds an associated third threshold level and the sum of the second set of selected output signals is greater than the sum of the first set of selected output signals, and
   (d) means to produce a digital recognition signal by logical combination of the plurality of first, second, and third digital logic signals.

7. A device as in claim 6 wherein:
   (a) an operational amplifier to produce a second output signal in response to the reception of an input signal from the sensing means over the total scan of the reference domain is included, and
   (b) the first threshold level is a predetermined fraction of the second output signal, and
   (c) means to provide polarity inversion of the second output signal is included, and
   (d) the second threshold level is a predetermined fraction of the second output signal when the difference signal is of a first polarity, and
   (e) the third threshold level is a predetermined fraction of the polarity inverted second output signal when the difference signal is of a second polarity.

8. A device as in claim 7 wherein the plurality of differential input amplifiers each includes means to assign the sum of one set of selected output signals a greater weight in the production of the associated difference signals than the sum of the other set of selected output signals.

9. A device as in claim 8 wherein each of the plurality of differential input amplifiers is constructed to combine a fraction of the second output signal with the associated weighted analog difference signal.

10. A signal conversion means, comprising:
    (a) means to scan a data-bearing indicia containing a data pattern to produce recognizable indications of the data pattern, and
    (b) means to sense the recognizable indications produced by the scanning means and to produce an input signal in response thereto, and
    (c) a first operational amplifier coupled to the sensing means to produce a first output signal, and
    (d) a second operational amplifier coupled to the sensing means to produce a second output signal in response to the reception of an input signal from the sensing means over the total scan of the data-bearing indicia, and
    (e) gate means coupled to the first operational amplifier, said gate means being constructed to selectively control the application of the input signal to the first operational amplifier during selected portions of the scan, in correspondence with selected sub-portions of the data-bearing indicia, and
    (f) digital signal producing means coupled to the first operational amplifier and to the second operational amplifier to produce a digital signal of one state when the first output signal is greater than a predetermined fraction of the second output signal and to produce a digital signal of the other digital state when the first output signal is smaller than the predetermined fraction of the second output signal.

11. A device as in claim 10 wherein the first and second operational amplifiers are integrating operational amplifiers.

12. A device as in claim 11 wherein:
    (a) a first two-terminal impedance means has one terminal connected to the output of the first integrating operational amplifier, and
    (b) a second two-terminal impedance means has one terminal connected to the output of the second integrating operational amplifier, the other terminals of the first and second impedance means being connected together, and
    (c) threshold level detecting means are coupled to the common junction point of the first and second impedance means, and
    (d) means to produce a digital signal are coupled to the threshold detecting means, said digital signal means constructed to be in one digital state when the threshold level is exceeded and to be in the other digital state when the threshold level is not exceeded.

13. A signal conversion means comprising:
    (a) means to scan a data-bearing indicia containing a data pattern to produce recognizable indications of the data pattern, and
    (b) means to sense the recognizable indications produced by the scanning means and to produce an input signal in response thereto, and
    (c) a plurality of first operational amplifiers coupled to the sensing means to produce a plurality of first output signals, and
    (d) a second operational amplifier coupled to the sensing means to produce a second output signal in response to the reception of an input signal from the sensing means over the total scan of the data-bearing indicia, and
    (e) gate means coupled to the plurality of first operational amplifiers, said gate means being constructed to selectively control the application of the input signal to each first operational amplifier during selected portions of the scan, in correspondence with selected sub-portions of the data-bearing indicia, and
    (f) means to produce a plurality of analog difference signals that are each a function of the difference between the sum of a first set of selected first output signals and the sum of a second set of selected first output signals, the first and second sets of selected first output signals being selected to represent predetermined comparisons of the data contained in various sub-portions of the data-bearing indicia, and
    (g) digital signal producing means coupled to the second optional amplifier and to the means to produce the analog difference signal to produce a digital signal of one state when the analog difference signal is greater than a predetermined fraction of the second output signal and to produce a digital signal of the other data state when the analog difference signal is smaller than the predetermined fraction of the second output signal.

14. A device as in claim 13 wherein the plurality of first operational amplifiers and the second operational amplifier are integrating operational amplifiers.

15. A device as in claim 14 wherein the means to produce the plurality of analog difference signals are differential input amplifiers.

16. A device as in claim 15 wherein:
    (a) a plurality of first two-terminal impedance means each have one terminal connected to the output of the second integrating operational amplifier, and
    (b) a plurality of second two-terminal impedance means each have one terminal connected to the output of one of the differential input amplifiers, the other terminal of each one of the first impedance means being connected to the other terminal of one of the second impedance means, and (c) a plurality of threshold level detecting means each are coupled to the common junction point of one pair of first and second impedance means, and (d) a plurality of means to produce digital signals are each coupled to one of the threshold detecting means, said digital signal means constructed to be in one digital state when the associated threshold level is exceeded and to be in the other digital state when the associated threshold level is not exceeded.

17. A device as in claim 16 wherein each of the plurality of differential input amplifiers includes means to assign the sum of one set of selected first output signals a greater weight in the production of the associated analog difference signal than the sum of the other set of selected first output signals.

18. A device as in claim 17 wherein each of the plurality of differential input amplifiers is constructed to combine a fraction of the second output signal with the associated weighted analog difference signal.

References Cited
UNITED STATES PATENTS 3,206,725  9/1965  Fitzmaurice _____ 340—146.3

MAYNARD R. WILBUR, Primary Examiner

THOMAS J. SLOYAN, Assistant Examiner

UNITED STATES PATENT OFFICE
CERTIFICATE OF CORRECTION

Patent No. 3,492,647                                                January 27, 197

Klaus W. Otten et al.

It is certified that error appears in the above identified patent and that said Letters Patent are hereby corrected as shown below:

Column 4, line 17, ". Size normalization may also be achieved by elec-" should read -- 34. A normalized image area can be achieved merely --. Column 10, line 34, "$\overline{A} \cdot \overline{B}$" should r -- $\overline{\overline{A} \cdot \overline{B}}$ --. Column 11, line 40, after "functions" insert -- . "$b_N$" and the "$B_N$" --. Column 15, line 44, after "nals" insert -- "$a_{total}$" and --.

Signed and sealed this 17th day of November 1970.

(SEAL)
Attest:

Edward M. Fletcher, Jr.                                    WILLIAM E. SCHUYLER, J
Attesting Officer                                                    Commissioner of Paten